US012537128B2

(12) United States Patent
Sato et al.

(10) Patent No.: US 12,537,128 B2
(45) Date of Patent: Jan. 27, 2026

(54) COIL COMPONENT

(71) Applicant: TAIYO YUDEN CO., LTD., Tokyo (JP)

(72) Inventors: Natsuko Sato, Tokyo (JP); Tomoo Kashiwa, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 613 days.

(21) Appl. No.: 18/093,061

(22) Filed: Jan. 4, 2023

(65) Prior Publication Data

US 2023/0245817 A1 Aug. 3, 2023

(30) Foreign Application Priority Data

Jan. 31, 2022 (JP) ................................ 2022-013373

(51) Int. Cl.
*H01F 27/29* (2006.01)
*H01F 27/24* (2006.01)
*H01F 27/28* (2006.01)

(52) U.S. Cl.
CPC ........... *H01F 27/292* (2013.01); *H01F 27/24* (2013.01); *H01F 27/2804* (2013.01); *H01F 2027/2809* (2013.01)

(58) Field of Classification Search
CPC .... H01F 27/292; H01F 27/24; H01F 27/2804; H01F 2027/2809
See application file for complete search history.

(56) References Cited

U.S. PATENT DOCUMENTS

2003/0141952 A1* 7/2003 Moro .................. H01F 41/0246 336/90
2014/0138986 A1 5/2014 Tsuneyama et al.
2016/0322154 A1* 11/2016 Park ......................... H01F 17/04
2020/0321156 A1* 10/2020 Morita .................... H01F 17/04
2020/0411228 A1* 12/2020 Arai ....................... H01F 41/041
2021/0035730 A1* 2/2021 Hachiya .............. H01F 27/2823

FOREIGN PATENT DOCUMENTS

JP 2006237398 A * 9/2006
JP 2010087240 A * 4/2010
JP 2010147272 A * 7/2010
JP 2013-018352 A 1/2013

* cited by examiner

*Primary Examiner* — Malcolm Barnes
(74) *Attorney, Agent, or Firm* — Pillsbury Winthrop Shaw Pittman, LLP

(57) ABSTRACT

A coil component according to one embodiment includes a base body, a coil conductor provided in the base body, and an external electrode electrically connected to the coil conductor. The base body may have a rectangular shape, as viewed from one axial direction. The base body has a first long side and a first short side shorter than the first long side, as viewed from one axial direction. The coil conductor includes a winding portion. The winding portion includes a first curved portion convexly curved toward the first short side, as viewed from the one axial direction. The major axis of the winding portion is inclined with respect to the first long side of the base body. The winding portion has a shape of a convex set, as viewed from the one axial direction.

12 Claims, 15 Drawing Sheets

COIL COMPONENT

CROSS-REFERENCE TO RELATED APPLICATIONS

This application is based on and claims the benefit of priority from Japanese Patent Application Serial No. 2022-013373 (filed on Jan. 31, 2022), the contents of which are hereby incorporated by reference in their entirety.

TECHNICAL FIELD

The present disclosure relates mainly to a coil component.

BACKGROUND

Coil components are passive elements used in electronic devices. For example, coil components are used to eliminate noise in power source lines or signal lines. Coil components are constituted by a base body made of a magnetic material, a coil conductor provided in the base body, and an external electrode connected to the coil conductor. The coil conductor includes a winding portion extending along a circumferential direction around a coil axis, and a lead-out portion that connects the winding portion to the external electrode.

As disclosed in Japanese Patent Application Publication No. 2013-018352, the outer edge of the winding portion of the coil conductor has a smooth shape as viewed from the viewpoint in the direction of the coil axis (see FIG. 7). The winding portion of the coil conductor has, for example, an elliptic, oval, or rectangular shape. A smooth shape of the winding portion reduces the direct current resistance (Rdc) of the coil conductor. The smooth shape of the winding portion also prevents a magnetic flux generated when an electric current flowing in the coil conductor changes from concentrating in some regions within the magnetic base body.

The base body of a conventional coil component has a rectangular shape as viewed from the viewpoint in the direction of the coil axis. A magnetic flux generated when an electric current flowing in the coil conductor changes is less likely to flow in the regions near the corners of the base body having a rectangular shape. Therefore, the regions near the corners of the base body contribute less to improvement of the characteristics of the coil component. It is desirable to utilize the regions near the corners of the base body to improve the characteristics of coil component.

SUMMARY

One object of the present disclosure is to provide a coil component having characteristics improved by utilizing the regions near the corners of the base body. Other objects of the present disclosure will be made apparent through the entire description in the specification. The invention disclosed herein may also address drawbacks other than that grasped from the above description.

A coil component according to one embodiment includes a base body, a coil conductor provided in the base body, and an external electrode electrically connected to the coil conductor. In one embodiment, the base body may have a rectangular shape, as viewed from one axial direction. The base body has a first long side and a first short side shorter than the first long side, as viewed from one axial direction. The coil conductor includes a winding portion. The winding portion includes a first curved portion convexly curved toward the first short side, as viewed from the one axial direction. The winding portion has a major axis and a minor axis orthogonal to the major axis, and the major axis is inclined with respect to the first long side of the base body. The winding portion has a shape of a convex set.

In one embodiment, the winding portion includes a first straight portion facing the first long side of the base body and extending in a straight line, as viewed from the one axial direction.

In one embodiment, the base body has a first long side, a first short side shorter than the first long side, a second long side opposed to the first long side, and a second short side opposed to the first short side, as viewed from the one axial direction. A radius of a first imaginary circle in contact with the first short side, the first long side, and the winding portion is smaller than a radius of a second imaginary circle in contact with the first short side, the second long side, and the winding portion. The coil conductor according to one embodiment includes a winding portion having a major axis and a lead-out portion extending in the one axial direction within the second imaginary circle and connected to the external electrode.

In one embodiment, the major axis of the winding portion intersects with the first short side. In one embodiment, the geometric center of the base body coincides with the geometric center of the winding portion, as viewed from the one axial direction.

In one embodiment, a ratio of a dimension of the winding portion in a direction of the minor axis orthogonal to a direction of the major axis to a dimension of the winding portion in the direction of the major axis is smaller than a ratio of a length of the first short side to a length of the first long side.

In one embodiment, the base body includes a core region located inside the winding portion and a margin region located outside the winding portion, as viewed from the one axial direction. In one embodiment, the difference between the area of the margin region and the area of the core region is 10% or less of the area of the core region.

In one embodiment, the winding portion includes a second curved portion convexly curved toward the second short side, as viewed from the one axial direction.

In one embodiment, the winding portion includes a third curved portion convexly curved toward the first long side, as viewed from the one axial direction.

In one embodiment, the coil conductor includes a first straight portion facing the first long side of the base body and extending in a straight line, as viewed from the one axial direction.

In one embodiment, a radius of a first imaginary circle in contact with the first short side, the first long side, and the winding portion is smaller than a radius of a second imaginary circle in contact with the first short side, the second long side, and the winding portion, as viewed from the one axial direction.

In one embodiment, the coil conductor includes a lead-out portion extending in the one axial direction within the second imaginary circle, and the external electrode is connected to one end of the lead-out portion.

In one embodiment, a radius of a third imaginary circle in contact with the first long side, the second short side, and the winding portion is smaller than the radius of the second imaginary circle, as viewed from the one axial direction.

Advantageous Effects

Embodiments of the present disclosure provide a coil component having characteristics improved by utilizing the regions near the corners of the base body.

BRIEF DESCRIPTION OF THE DRAWINGS

In FIG. 4, a base body is transparent to show a coil conductor.

In FIG. 7, a base body is transparent to show a coil conductor.

In FIG. 8, a base body is transparent to show a coil conductor.

In FIG. 9, a base body is transparent to show a coil conductor.

In FIG. 11, a base body is transparent to show a coil conductor.

DESCRIPTION OF THE PREFERRED EMBODIMENTS

Figure 1:
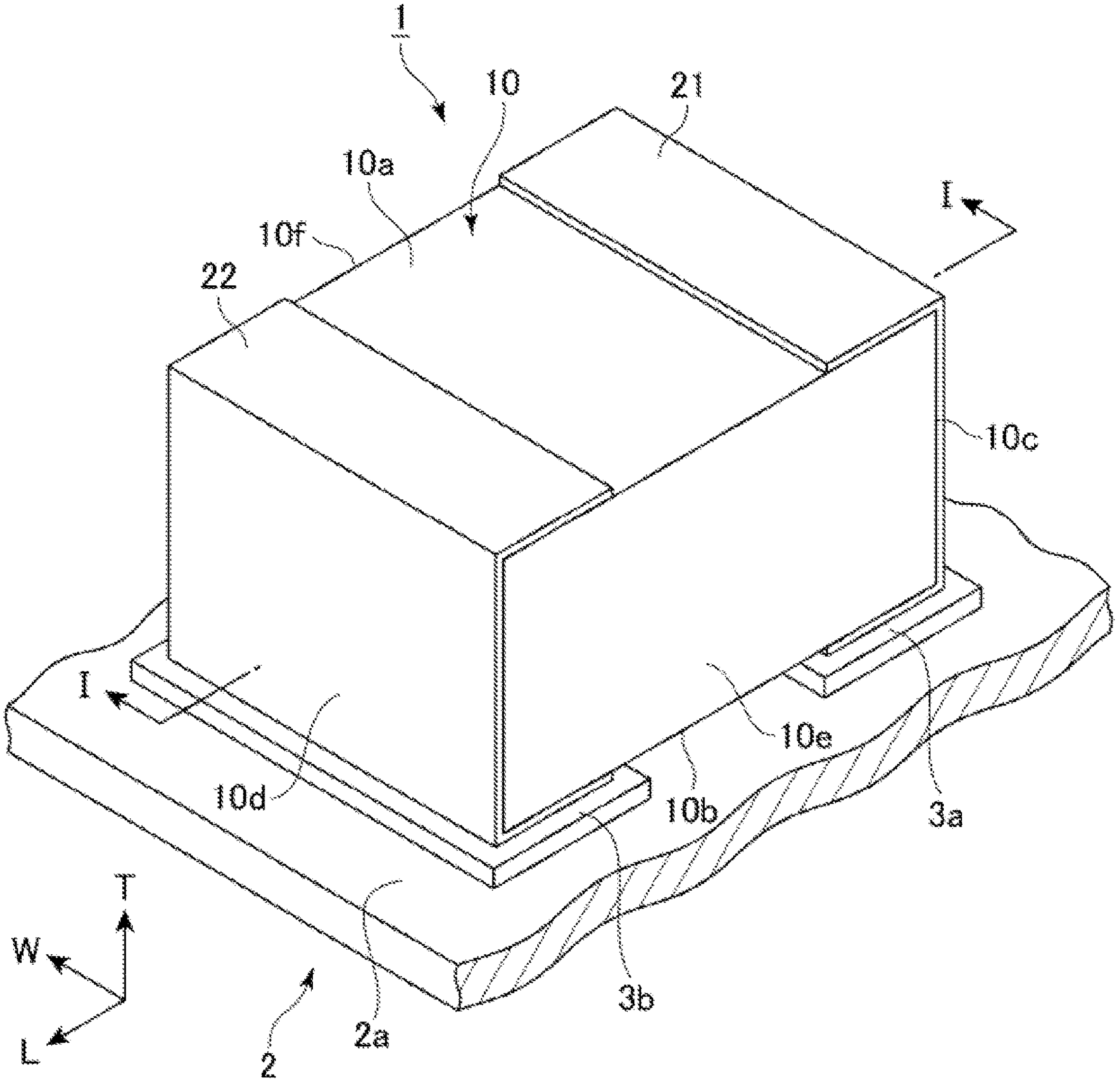
FIG. 1 is a perspective view schematically showing a coil component according to one embodiment.

Various embodiments of the present invention will be described hereinafter with reference to the appended drawings. Throughout the drawings, the same components common in the drawings are denoted by the same reference numerals. For convenience of explanation, the drawings are not necessarily drawn to scale. The following embodiments of the present invention do not limit the scope of the claims. The elements included in the following embodiments are not necessarily essential to solve the problem addressed by the invention.

Figure 2:
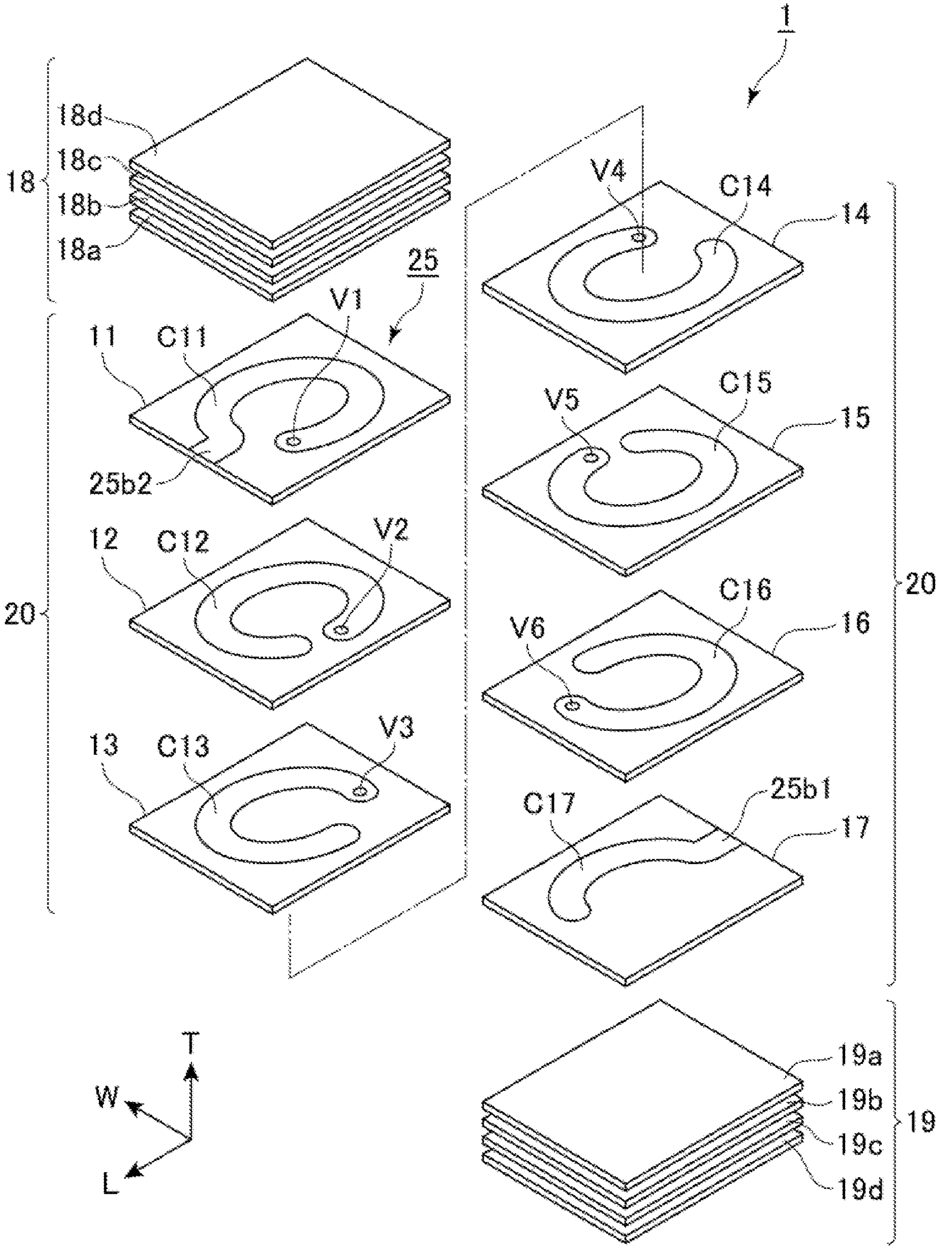
FIG. 2 is an exploded perspective view of the coil component shown in FIG. 1.
Figure 3:
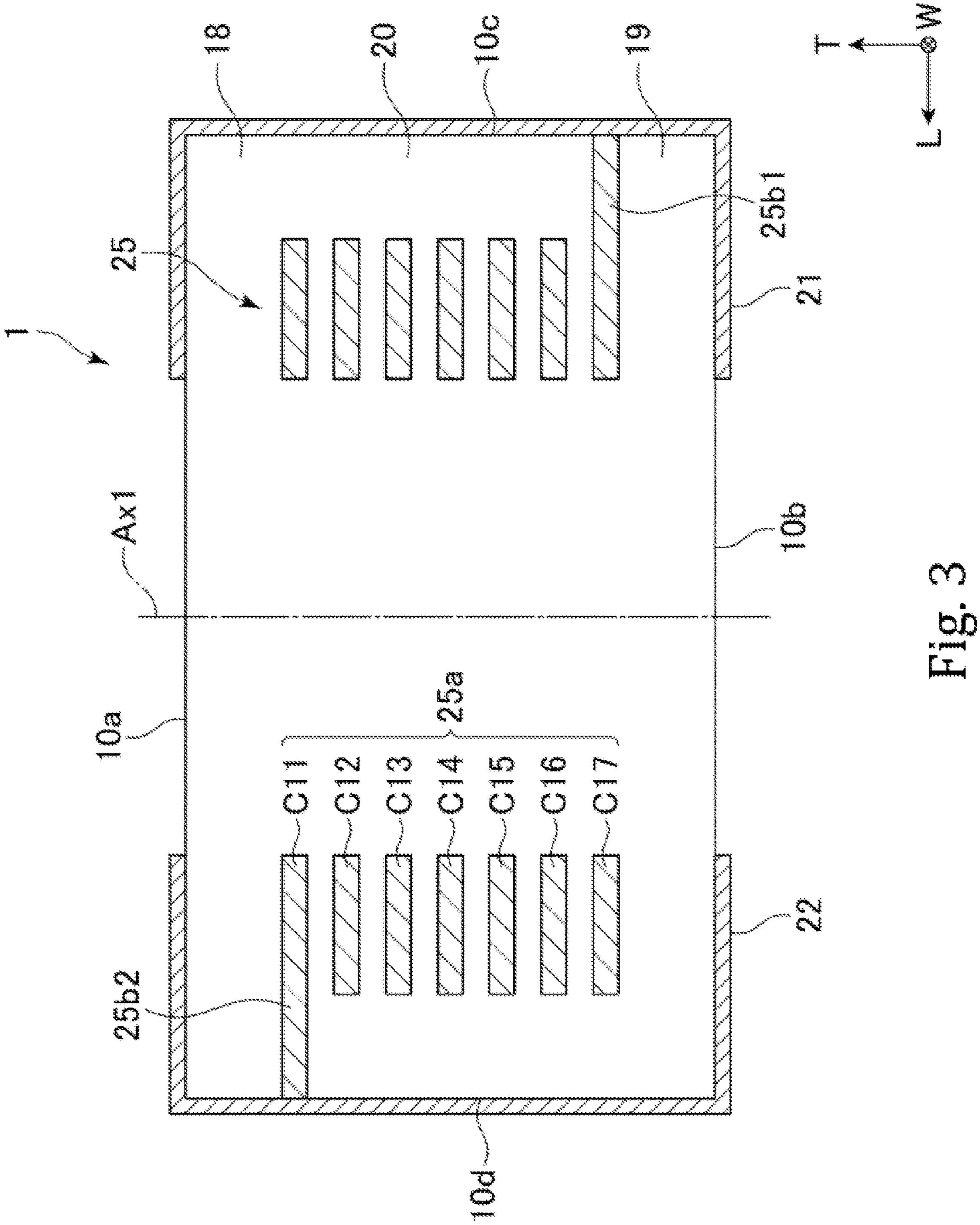
FIG. 3 is a sectional view schematically showing a section of the coil component of FIG. 1 cut along the line I-I.
Figure 4:
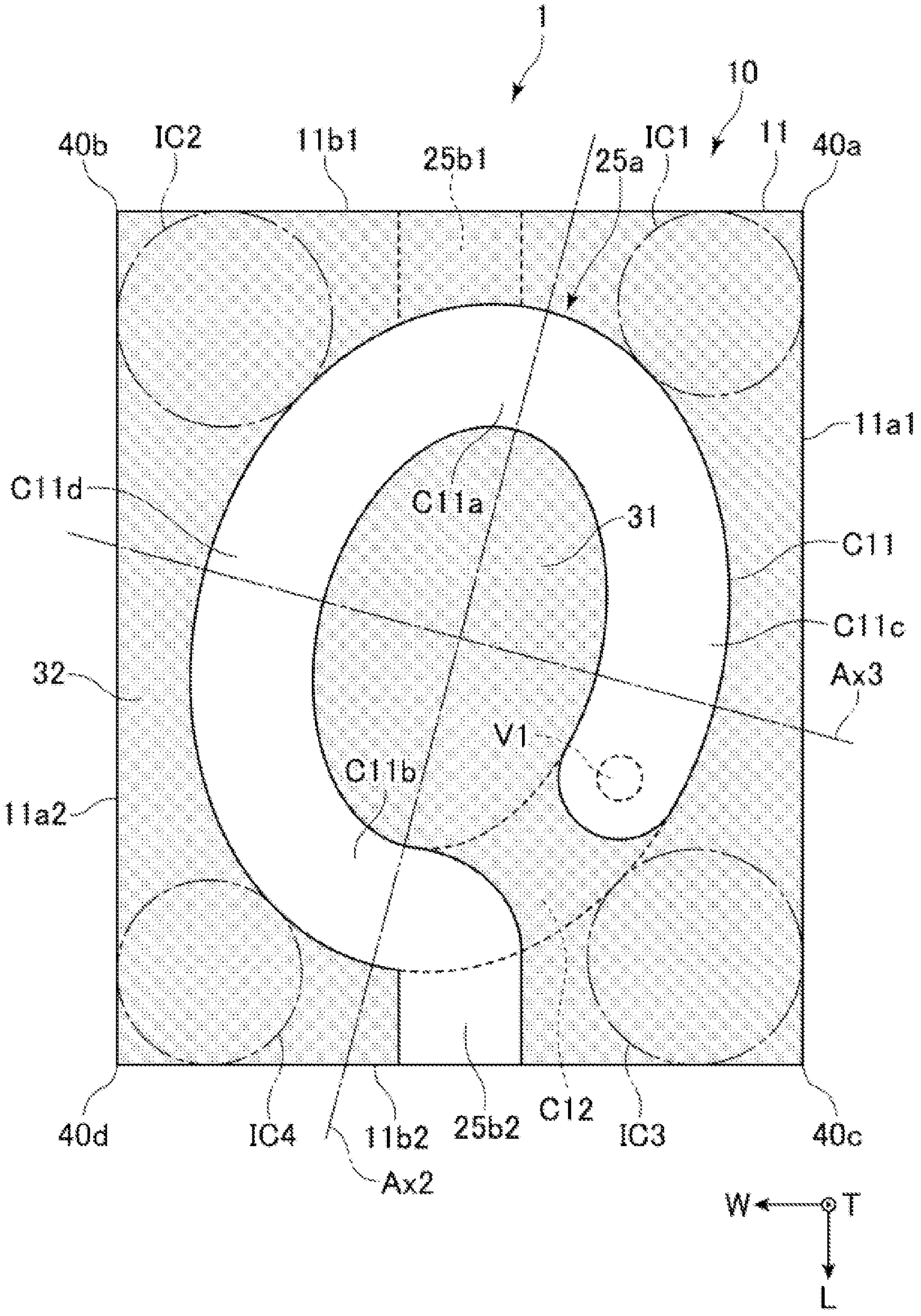
FIG. 4 is a plan view of the coil component of FIG. 1.

With reference to FIGS. 1 to 4, a description is given of a coil component 1 according to one embodiment. FIG. 1 is a schematic perspective view of the coil component 1, and FIG. 2 is an exploded perspective view of the coil component 1. FIG. 3 schematically shows a section of the coil component 1 cut along the line I-I in FIG. 1, and FIG. 4 is a plan view of the coil component 1. In FIGS. 2 and 4, external electrodes are omitted for convenience of description.

By way of one example of the coil component 1, FIGS. 1 to 4 show a laminated inductor. The laminated inductor shown is an example of the coil component 1 to which the invention can be applied. The invention can also be applied to various coil components other than the laminated inductor. For example, the coil component 1 may be a wire-wound coil.

As shown, the coil component 1 includes a base body 10, a coil conductor 25 provided in the base body 10, an external electrode 21 disposed on a surface of the base body 10, and an external electrode 22 disposed on the surface of the base body 10 at a position spaced apart from the external electrode 21. The external electrode 21 is electrically connected to one end of the coil conductor 25, and the external electrode 22 is electrically connected to the other end of the coil conductor 25.

The coil component 1 may be mounted on a mounting substrate 2*a*. The mounting substrate 2*a* has land portions 3*a*, 3*b* provided thereon. The coil component 1 is mounted on the mounting substrate 2*a* by connecting the external electrode 21 to the land portion 3*a* and connecting the external electrode 22 to the land portion 3*b*. A circuit board 2 according to one embodiment of the present invention includes the coil component 1 and the mounting substrate 2*a* having the coil component 1 mounted thereon. The circuit board 2 can be installed in various electronic devices. The electronic devices in which the circuit board 2 can be installed include smartphones, tablets, game consoles, electrical components of automobiles, servers, and various other electronic devices.

The coil component 1 may be an inductor, a transformer, a filter, a reactor, an inductor array and any one of various other coil components. The coil component 1 may alternatively be a coupled inductor, a choke coil, and any one of various other magnetically coupled coil components. Applications of the coil component 1 are not limited to those explicitly described herein.

In one embodiment, the base body 10 is formed of a magnetic material into a rectangular parallelepiped shape. In one embodiment of the present invention, the base body 10 is configured such that the dimension in the L-axis direction (length dimension) is greater than the dimension in the W-axis direction (width dimension) and the dimension in the T-axis direction (height dimension). For example, the length dimension is from 1.0 mm to 6.0 mm, the width dimension is from 0.5 mm to 4.5 mm, and the height dimension is from 0.5 mm to 4.5 mm. These dimensions may be smaller than the ranges described above. For example, the length dimension may be 0.6 mm, and the width dimension may be 0.3 mm. The dimensions of the base body 10 are not limited to those specified herein. The term "rectangular parallelepiped" or "rectangular parallelepiped shape" used herein is not intended to mean solely "rectangular parallelepiped" in a mathematically strict sense. The dimensions and the shape of the base body 10 are not limited to those specified herein.

The base body 10 has a first principal surface 10*a*, a second principal surface 10*b*, a first end surface 10*c*, a second end surface 10*d*, a first side surface 10*e*, and a second side surface 10*f*. The outer surface of the base body 10 is defined by these six surfaces. The first principal surface 10*a* and the second principal surface 10*b* are at the opposite ends in the height direction of the base body 10, the first end surface 10*c* and the second end surface 10*d* are at the opposite ends in the length direction of the base body 10, and the first side surface 10*e* and the second side surface 10*f* are at the opposite ends in the width direction of the base body 10. As shown in FIG. 1, the first principal surface 10*a* is at a top of the base body 10, and therefore, the first principal surface 10*a* may be referred to as a "top surface." Likewise, the second principal surface 10*b* may be referred to as a "lower surface" or "bottom surface." Since the coil component 1 is disposed such that the second principal surface 10*b* faces the mounting substrate 2*a*, the second principal surface 10*b* may be herein referred to as "the mounting surface." The top surface 10*a* and the bottom surface 10*b* are separated from each other by a distance equal to the height of the base body 10, the first end surface 10*c* and the second end surface 10*d* are separated from each other by a distance equal to the length of the base body 10, and the first side surface 10*e* and the second side surface 10*f* are separated from each other by a distance equal to the width of the base body 10.

The base body 10 is made of a magnetic material. The magnetic material may be a ferrite material, a soft magnetic alloy material, a composite magnetic material including magnetic particles dispersed in a resin, or any other known magnetic materials.

The ferrite material used for the base body 10 may be a Ni—Zn-based ferrite, a Ni—Zn—Cu-based ferrite, a Mn—Zn-based ferrite, or any other ferrite materials.

The metal magnetic particles contained in the magnetic material for the base body 10 are, for example, particles of (1) a metal such as Fe or Ni, (2) a crystalline alloy such as an Fe—Si—Cr alloy, an Fe—Si—Al alloy, or an Fe—Ni alloy, (3) an amorphous alloy such as an Fe—Si—Cr—B—C alloy or an Fe—Si—Cr—B alloy, or (4) a mixture thereof. The composition of the metal magnetic particles contained in the base body 10 is not limited to those described above. For example, the metal magnetic particles contained in the base body 10 may be particles of a Co—Nb—Zr alloy, an Fe—Zr—Cu—B alloy, an Fe—Si—B alloy, an Fe—Co—Zr—Cu—B alloy, an Ni—Si—B alloy, or an Fe—Al—Cr alloy. An insulating film may be formed on the surface of each of the metal magnetic particles. The insulating film may be an oxide film made of an oxide of the above metals or alloys. In one or more embodiments, the average particle size of the metal magnetic particles in the base body 10 is from 1.0 μm to 20 μm. The base body 10 may contain two or more types of metal magnetic particles having different average particle sizes.

In the base body 10, the metal magnetic particles may be bonded to each other with an oxide film formed by oxidation of an element included in the metal magnetic particles during a manufacturing process. The base body 10 may contain a binder in addition to the metal magnetic particles. When the base body 10 contains a binder, the metal magnetic particles are bonded to each other by the binder. The binder in the base body 10 may be formed, for example, by curing a thermosetting resin that has an excellent insulation property. Examples of a material for such a binder include an epoxy resin, a polyimide resin, a polystyrene (PS) resin, a high-density polyethylene (HDPE) resin, a polyoxymethylene (POM) resin, a polycarbonate (PC) resin, a polyvinylidene fluoride (PVDF) resin, a phenolic resin, a polytetrafluoroethylene (PTFE) resin, or a polybenzoxazole (PBO) resin.

As shown in FIG. 2, the base body 10 includes a magnetic layer 20, a bottom cover layer 19 provided on the bottom-side surface of the magnetic layer 20, and a top cover layer 18 provided on the top-side surface of the magnetic layer 20.

The magnetic layer 20 includes magnetic films 11 to 17. In the magnetic layer 20, the magnetic films 17, 16, 15, 14, 13, 12 and 11 are stacked in the stated order from the negative side toward the positive side in the T-axis direction.

The magnetic films 11 to 17 have the conductor patterns C11 to C17, respectively, formed on the top-side surfaces thereof. Each of the conductor patterns C11 to C17 extends around the coil axis Ax1 in a plane (LW plane) orthogonal to the coil axis Ax1. The conductor patterns C11 to C17 are formed by, for example, printing a conductive paste made of a highly conductive metal or alloy via screen printing. The material of the conductive paste may include Ag, Pd, Cu, Al, or an alloy of these elements. The conductor patterns C11 to C17 may be formed using other methods and materials. For example, the conductor patterns C11 to C17 may be formed by sputtering, ink-jetting, or other known methods.

The magnetic films 11 to 16 are provided with vias V1 to V6, respectively, at a predetermined position therein. The vias V1 to V6 are formed by forming a through hole at the predetermined position in the magnetic films 11 to 16 so as to extend through the magnetic films 11 to 16 in the Taxis direction and filling the through holes with a conductive material.

Each of the conductor patterns C11 to C17 is electrically connected to the respective adjacent conductor patterns through the vias V1 to V6. The conductor patterns C11 to C17 and the vias V1 to V6 connected together in this manner form the spiral coil conductor 25. In other words, the coil conductor 25 is constituted by the conductor patterns C11 to C17 and the vias V1 to V6.

The end of the conductor pattern C11 opposite to the end thereof connected to the via V1 is connected to the external electrode 22. The end of the conductor pattern C17 opposite to the end thereof connected to the via V6 is connected to the external electrode 21.

The top cover layer 18 includes magnetic films 18*a* to 18*d* made of a magnetic material, and the bottom cover layer 19 includes magnetic films 19*a* to 19*d* made of a magnetic material. In this specification of the present invention, the magnetic films 18*a* to 18*d* and the magnetic films 19*a* to 19*d* may be referred to collectively as "the cover layer magnetic films."

As shown in FIG. 3, the coil conductor 25 includes a winding portion 25*a* wound around the coil axis Ax1 extending along the thickness direction (T-axis direction), a lead-out portion 25*b*1 that extends from one end of the winding portion 25*a* to the first end surface 10*c* of the base body 10, and a lead-out portion 25*b*2 that extend from the other end of the winding portion 25*a* to the second end surface 10*d* of the base body 10.

As viewed from the direction of the coil axis Ax1, each of the conductor patterns C11 to C17 extends along a predetermined closed graphic pattern. Non-limiting examples of the closed graphic pattern include ellipses, ovals, and rectangles. Each of the conductor patterns C11 to C17 extends for less than one turn around the coil axis Ax1 in the associated LW plane and thus does not alone constitute the closed graphic patten. However, since each of the conductor patterns C11 to C17 extends along the common closed graphic pattern, the closed graphic pattern can be defined by projecting each of the conductor patterns C11 to C17 onto a plane perpendicular to the coil axis Ax1. The closed graphic pattern formed by the conductor patterns C11 to C17 may define the shape of the winding portion 25*a* as viewed from the direction of the coil axis Ax1. When, for example, the conductor patterns C11 to C17 extend along an ellipse, this ellipse defines the shape of the winding portion 25*a* as viewed from the direction of the coil axis Ax1.

The shape of the winding portion 25*a* as viewed from the direction of the coil axis Ax1 may be either the shape of the inner peripheral edge or the shape of the outer peripheral edge of the winding portion 25*a*. Each of the conductor patterns C11 to C17 has generally the same dimensions (width and thickness) in the direction orthogonal to the direction of the flow of the electric current, as viewed from the direction of the coil axis Ax1. Therefore, the inner peripheral edge and the outer peripheral edge of the winding portion 25*a* are generally similar to each other. If it is necessary to select whether the shape of the winding portion 25*a* is the shape of its inner peripheral edge or the shape of its outer peripheral edge, the shape of the outer peripheral edge may be taken as the shape of the winding portion 25*a*.

In one embodiment, as viewed from the direction of the coil axis Ax1, the winding portion 25*a* has a shape of a convex set. When the winding portion 25*a* has a shape of a convex set as viewed from a viewpoint in the direction of the coil axis Ax1, the winding portion 25*a* includes any point in the line segment connecting between any two points included in the outer peripheral edge of the winding portion 25*a* as viewed from a viewpoint in the direction of the coil axis Ax1. When the winding portion 25*a* has a shape of a convex set as viewed from the viewpoint in the direction of the coil axis Ax1, the winding portion 25*a* protrudes outward or extends linearly in the radial direction around the coil axis Ax1 between any two points in the outer peripheral edge of the winding portion 25*a*. Conversely, when the line segment connecting between any two points in the outer peripheral edge of the winding portion 25*a* extends outside the outer peripheral edge of the winding portion 25*a*, the winding portion 25*a* is not a convex set. More specifically, when the outer peripheral edge of the winding portion 25*a* has an elliptic, oval, or rectangular shape, the winding portion 25*a* has a shape of a convex set. The shape of the outer peripheral edge of the winding portion 25*a* is not limited to ellipses, ovals, and rectangles.

When the winding portion 25*a* has a shape of a convex set, the length of the winding portion can be smaller, and thus the direct current resistance (Rdc) of the coil conductor 25 can be reduced, as compared to the case where the winding portion 25*a* has a non-convex shape. Also, when the winding portion 25*a* has a shape of a convex set, it is possible to inhibit a magnetic flux generated when an electric current flowing in the coil conductor 25 changes from concentrating in some regions within the base body 10.

Next, with reference to FIG. 4, a further description is given of the coil component 1. FIG. 4 is a plan view of the coil component 1. In FIG. 4, the base body 10 is transparent to show the winding portion 25*a*. As shown, the base body 10 has a rectangular shape in plan view (i.e., as viewed from a viewpoint in the direction of the coil axis Ax1). In the embodiment shown, the outer edge of the base body 10 having a rectangular shape is defined by a first long side 11*a*1 extending in the L-axis direction, a second long side 11*a*2 opposed to the first long side 11*a*1, a first short side 11*b*1 extending in the W-axis direction, and a second short side 11*b*2 opposed to the first short side 11*b*1.

In the embodiment shown, the winding portion 25*a* has an elliptic shape. FIG. 4 shows the conductor pattern C11 formed on the magnetic film 11 and a part of the conductor pattern C12 formed on the magnetic film 12. In this way, the conductor pattern C11 and the conductor pattern C12 are projected onto a projection surface (the magnetic film 11 in FIG. 4) perpendicular to the coil axis Ax1, and the projection image of the conductor pattern C11 and the conductor pattern C12 appearing on the projection surface defines the shape of the winding portion 25*a* as viewed from the direction of the coil axis Ax1. The shape of the winding portion 25*a* may be defined by the projection image of other conductor patterns instead of the projection image of the conductor pattern C11 and the conductor pattern C12. The shape of the winding portion 25*a* can be defined based on a projected figure of conductor patterns projected onto a projection surface perpendicular to the coil axis Ax1, the conductor patterns being continuous conductor patterns selected from the conductor patterns C11 to C17 and having a total number of turns equal to or larger than one. This projection image also defines the outer peripheral edge and the inner peripheral edge of the winding portion 25*a*.

In the base body 10, a region inside the inner peripheral edge of the winding portion 25*a* is referred to as a core region 31, and a region outside the outer peripheral edge of the winding portion 25*a* is referred to as a margin region 32. In one embodiment, the outer edge of the core region 31 is defined by the inner peripheral edge of the winding portion 25*a*. As described above, the winding portion 25*a* has a shape of a convex set and the width of the winding portion 25*a* is constant along the direction of the current flow, and therefore, the core region 31 also has a shape of a convex set.

In one embodiment, the difference between the area of the margin region 32 and the area of the core region 31 is 10% or less of the area of the core region 31.

The winding portion 25*a* has a major axis Ax2 and a minor axis Ax3 as viewed from a viewpoint in the direction of the coil axis Ax1. The major axis Ax2 is the axis that extends along the direction in which extends the longest one of the line segments that pass through the geometric center of the winding portion 25*a* and extend from one point to another in the outer peripheral edge of the winding portion 25*a*. The minor axis Ax3 is the axis that passes through the geometric center of the winding portion 25*a* and is orthogonal to the major axis Ax2. When the winding portion 25*a* has an elliptic shape, as in the embodiment shown, the major axis of the ellipse is the major axis Ax2 of the winding portion 25*a*, and the minor axis of the ellipse is the minor axis Ax3 of the winding portion 25*a*.

The winding portion 25*a* may be positioned at the center of the base body 10, as viewed from a viewpoint in the direction of the coil axis Ax1. In other words, the center of the winding portion 25*a* may coincide with the center of the base body 10, as viewed from a viewpoint in the direction of the coil axis Ax1. This configuration uniforms the distribution of the magnetic flux in the base body 10, as compared to the case where the center of the winding portion 25*a* does not coincide with the center of the base body 10. The base body 10 and the winding portion 25*a* each have a geometric center. The center of the base body 10 may refer to the geometric center of the base body 10 as viewed from a viewpoint in the direction of the coil axis Ax1. Since the base body 10 has a rectangular shape, the center of the base body 10 may be the intersection of the two diagonals of the base body 10 as viewed from a viewpoint in the direction of the coil axis Ax1. The middle of the winding portion 25*a* may refer to the geometric center of the winding portion 25*a*. When the winding portion 25*a* is symmetrical with respect to each of the major axis Ax2 and the minor axis Ax3, the center of the winding portion 25*a* may be the intersection of the major axis Ax2 and the minor axis Ax3. In one embodiment, as viewed from a viewpoint in the direction of the coil axis Ax1, when the distance between the center (e.g., the geometric center) of the base body 10 and the center (e.g., the geometric center) of the winding portion 25*a* is within 20%, 10%, 5%, 4%, 3%, 2%, or 1% of the length of the minor axis Ax3 of the winding portion 25*a*, the center of the base body 10 and the center of the winding portion 25*a* can be regarded to coincide with each other. The center of the base body 10 and the center of the winding portion 25*a* may coincide strictly with each other. The winding portion 25*a* is not necessarily positioned at the center of the base body 10, as viewed from a viewpoint in the direction of the coil axis Ax1. In other words, the center of the winding portion 25*a* may not coincide with the center of the base body 10, as viewed from a viewpoint in the direction of the coil axis Ax1. This configuration facilitates securement of a portion in the base body 10 occupied by a via or vias when the via or vias are used to connect the winding portion with the external electrode 21 and/or the external electrode 22.

In one embodiment, the major axis Ax2 is inclined with respect to the first long side 11*a*1. In the embodiment shown, the major axis Ax2 is inclined with respect to the first long side 11*a*1 by about 20°. In other words, the major axis Ax2 and a straight line extending along the first long side 11*a*1 form an angle of about 20°. The inclination angle of the major axis Ax2 to the first long side 11*a*1, i.e., the angle between the major axis Ax2 and a straight line extending along the first long side 11*a*1 may be 5° or larger. In one embodiment, the major axis Ax2 intersects with the first short side 11*b*1. The major axis Ax2 may intersect with both the first short side 11*b*1 and the second short side 11*b*2. In one embodiment, the major axis Ax2 intersects with none of the first long side 11*a*1 and the second long side 11*a*2. In one embodiment, the minor axis Ax3 intersects with the first long side 11*a*1. The minor axis Ax3 may intersect with both the first long side 11*a*1 and the second long side 11*a*2.

The winding portion 25*a* may be symmetrical with respect to the major axis Ax2. The winding portion 25*a* may be symmetrical with respect to the minor axis Ax3. The winding portion 25*a* may be symmetrical with respect to each of the major axis Ax2 and the minor axis Ax3. In the embodiment shown, the winding portion 25*a* has an elliptic shape. The winding portion 25*a* having an elliptic shape is symmetrical with respect to each of the major axis Ax2 and the minor axis Ax3. The winding portion 25*a* may be asymmetrical with respect to the major axis Ax2. The winding portion 25*a* may be asymmetrical with respect to the minor axis Ax3.

In one embodiment, the winding portion 25*a* has a first portion C11*a* facing the first short side 11*b*1, a second portion C11*b* facing the second short side 11*b*2, a third portion C11*c* facing the first long side 11*a*1, and a fourth portion C11*d* facing the second long side 11*a*2. In the embodiment shown, the first portion C11*a* is convexly curved toward the first short side 11*b*1, and the second portion C11*b* is convexly curved toward the second short side 11*b*2. In addition, the third portion C11*c* is convexly curved toward the first long side 11*a*1, and the fourth portion C11*d* is convexly curved toward the second long side 11*a*2. The two straight lines bisecting the angles formed by the major axis Ax2 and minor axis Ax3 form partitions between the first portion C11*a* and the third portion C11*c*, between the first portion C11*a* and the fourth portion C11*d*, between the second portion C11*b* and the third portion C11*c*, and between the second portion C11*b* and the fourth portion C11*d*.

The winding portion 25*a* is disposed in the base body 10 such that its major axis Ax2 is inclined with respect to the first long side 11*a*1. Therefore, of the regions near the four corners of the base body 10 having a rectangular shape, the region near the first corner 40*a* at which the first long side 11*a*1 and the first short side 11*b*1 intersect is smaller than the region near the second corner 40*b* at which the second long side 11*a*2 and the first short side 11*b*1 intersect, as viewed from the direction of the coil axis Ax1. The region near the first corner 40*a* and the region near the second corner 40*b* of the base 10 will now be described based on the first imaginary circle IC1 and the second imaginary circle IC2 shown in FIG. 4. In FIG. 4, assuming that the first imaginary circle IC1 contacts with the first long side 11*a*1, the first short side 11*b*1, and the winding portion 25*a* and the second imaginary circle IC2 contacts with the second long side 11*a*2, the first short side 11*b*1, and the winding portion 25*a*, the radius of the first imaginary circle IC1 is smaller than that of the second imaginary circle IC2.

Likewise, the radius of the first imaginary circle IC1 is smaller than that of the third imaginary circle IC3 that contacts with the first long side 11*a*1, the second short side 11*b*2, and the winding portion 25*a*. The fourth imaginary circle IC4 that contacts with the second long side 11*a*2, the second short side 11*b*2, and the winding portion 25*a* is smaller than both of the second imaginary circle IC2 and the third imaginary circle IC3.

Figure 5A:
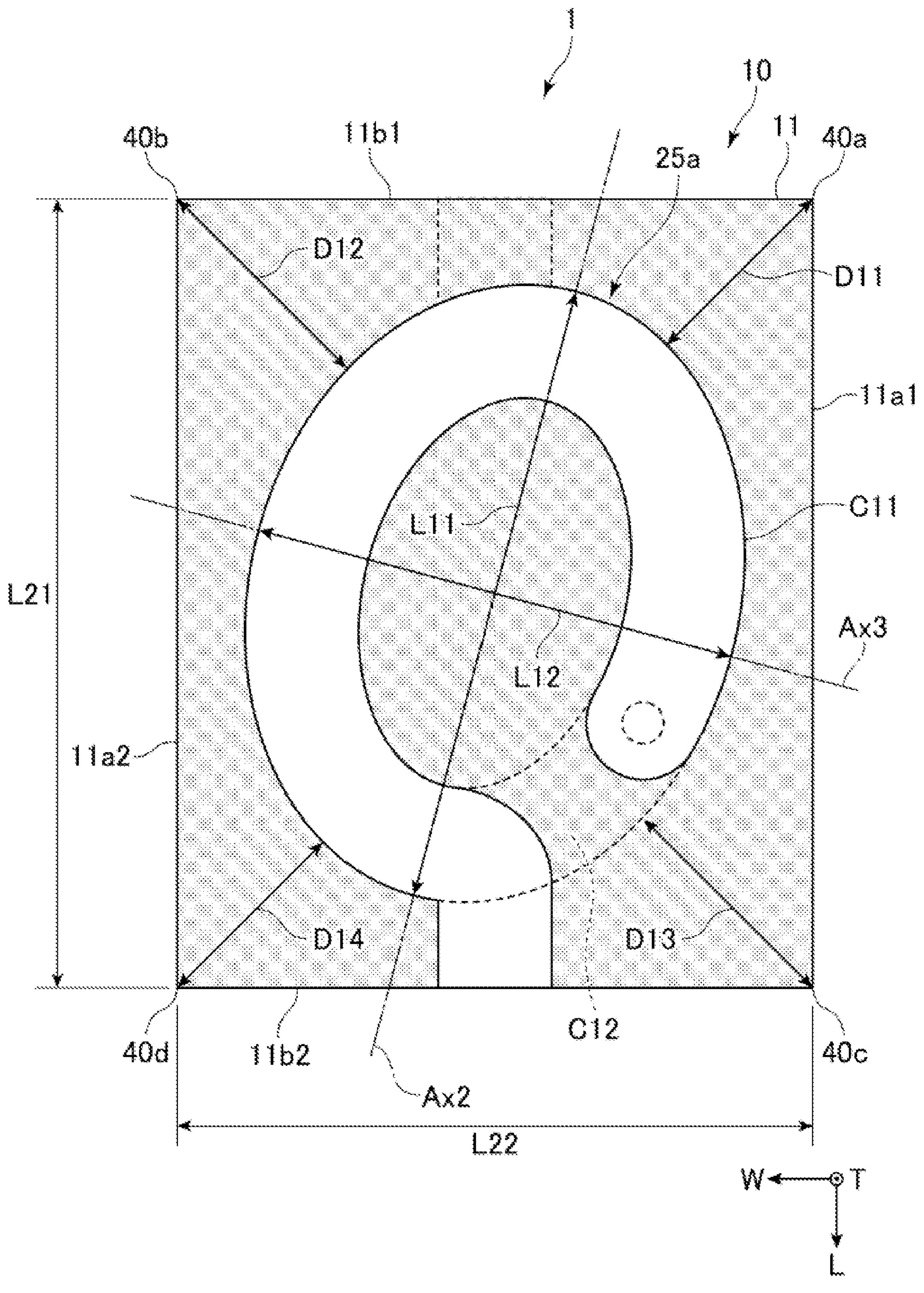
FIG. 5A is a plan view of the coil component of FIG. 1 with dimension lines drawn therein.
Figure 5B:
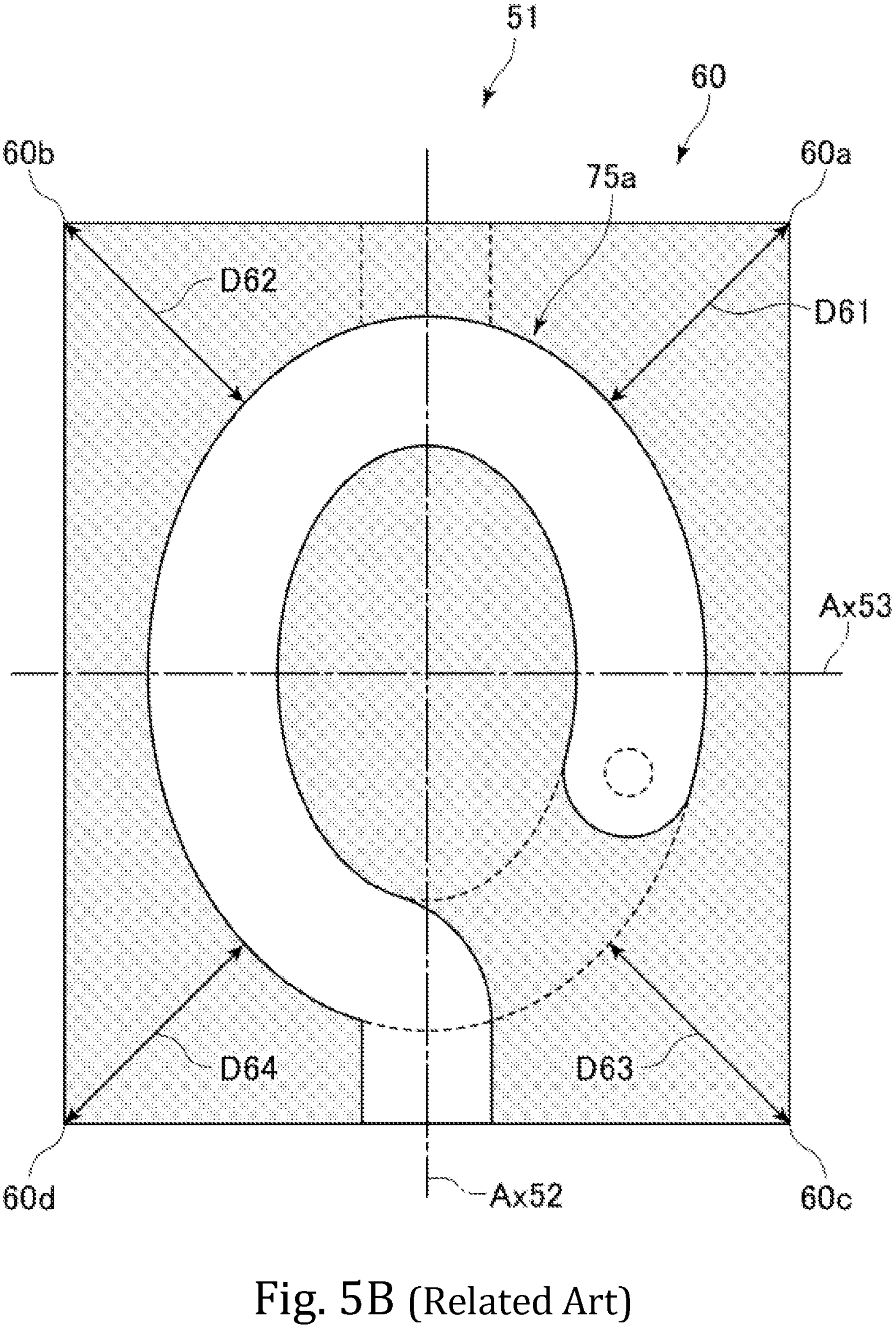
Fig. 5B (Related Art)
FIG. 5B is a schematic plan view of a conventional coil component.

With reference to FIGS. 5A and 5B, the following describes the coil component 1 according to one embodiment in comparison with a conventional coil component. FIG. 5A is a plan view of the coil component 1 according to one embodiment, and FIG. 5B is a plan view of a conventional coil component 51 having a winding portion 75*a* with an elliptic shape in plan view. FIG. 5A shows the plan view of FIG. 4 with dimension lines added thereto.

As shown in FIG. 5B, in the conventional coil component 51 shown in plan view, the major axis Ax52 of the winding portion 75*a* extends in the direction parallel to the long sides of the base body 60 having a rectangular shape, and the minor axis Ax53 extends in the direction parallel to the short sides of the base body 60 having the rectangular shape. In other words, in the conventional coil component 51 shown in plan view, the major axis of the winding portion 75*a* is not inclined with respect to the long sides of the base body 60. Therefore, the distances D61, D62, D63, D64 from the four corners 60*a*, 60*b*, 60*c*, 60*d* of the base body 10 to the winding portion 75*a* (these distances refer to the shortest distances; this also applies to the following description) are the same.

On the other hand, as shown in FIG. 5A, in the coil component 1 according to one embodiment, the major axis Ax2 of the winding portion 25*a* is inclined with respect to the first long side 11*a*1 of the base body 10, and thus the distance D11 from the first corner 40*a* at which the first long side 11*a*1 and the first short side 11*b*1 of the base body 10 intersect to the winding portion 25*a* is smaller than the distance D12 from the second corner 40*b* at which the second long side 11*a*2 and the first short side 11*b*1 intersect to the winding portion 25*a*. Likewise, the distance D11 is smaller than the distance D13 from the third corner 40*c* at which the first long side 11*a*1 and the second short side 11*b*2 intersect to the winding portion 25*a*. The distance D11 may be the same as the distance D14 from the fourth corner 40*d* at which the second long side 11*a*2 and the second short side 11*b*2 intersect to the winding portion 25*a*. The distance D14 is smaller than both the distance D12 and the distance D13.

In the conventional coil component 51, the magnetic flux generated by the change in the current flowing through the winding portion 75*a* is less likely to pass through the regions near the four corners 60*a* to 60*d* that are at a large distance from the winding portion 75*a*. Therefore, the regions near the four corners 60*a* to 60*d* of the base body 60 contribute less to improvement of the characteristics of the coil component 51. On the other hand, in the coil component 1 according to one embodiment, the major axis Ax2 of the winding portion 25*a* is inclined with respect to the first long side 11*a*1 of the base body 10, and thus the distance D11 from the top right corner 40*a* of the base body 10 to the winding portion 25*a* is smaller than the distance D61 from the top right corner 60*a* of the base body 60 to the winding portion 75*a* in the conventional coil component 51. Likewise, the distance D14 from the bottom left corner 40*d* of the base body 10 to the winding portion 25*a* is smaller than the distance D64 from the bottom left corner 60*d* of the base body 60 to the winding portion 75*a* in the conventional coil component 51. Therefore, in the coil component 1, the magnetic flux generated when the current flowing through the coil conductor 25 changes is more likely to pass through the regions near the first corner 40*a* and the fourth corner 40*d* among the four corners 40*a* to 40*d* of the base body 10, as compared to the conventional coil component 51. Therefore, even if the winding portion 75*a* and the winding portion 25*a* have the same shape, the inductance of the coil component 1 can be higher than the inductance of the conventional coil component 51. The distance D12 from the top left corner 40*b* of the base body 10 to the winding portion 25*a* in the coil component 1 is larger than the distance D62 from the top left corner 60*b* of the base body 60 to the winding portion 75*a* in the conventional coil component 51, and the distance D13 from the bottom right corner 40*c* of the base body 10 to the winding portion 25*a* in the coil component 1 is larger than the distance D63 from the bottom right corner 60*c* of the base body 60 to the winding portion 75*a* in the conventional coil component 51. However, the regions near the top left corner 60*b* and the bottom right corner 60*c* in the conventional coil component 51 hardly contributes to the improvement of the inductance, and thus the distance D12 and the distance D13 in the coil component 1 that are larger than those in the conventional coil component 51 do not cause degradation of the inductance. Thus, in the coil component 1, the winding portion 25*a* is disposed such that the major axis Ax2 is inclined with respect to the first long side 11*a*1 of the base body 10, and thus the regions near the corners of the base body 10 can be utilized to improve the inductance.

In one embodiment, the winding portion 25*a* has a dimension L11 (long diameter L11) in the major axis direction along the major axis Ax2 and a dimension L12 (short diameter L12) in the minor axis direction orthogonal to the major axis direction, and the ratio L12/L11 is smaller than the ratio L22/L21 of the length L21 of the first long side 11*a*1 to the length L22 of the first short side 11*b*1 of the base body 10. That is, (L12/L11)/(L22/L21) is smaller than 1. As (L12/L11)/(L22/L21) is approximate to 1, the margin region 32 is narrow, and thus the magnetic saturation is more likely to occur in the margin region 32. Conversely, if (L12/L11)/(L22/L21) is too small, the margin region 32 is wide, resulting in a low magnetic flux density in some part of the margin region 32. This deteriorates the utilization efficiency of the base body 10 for obtaining magnetic characteristics. Therefore, in one embodiment, (L12/L11)/(L22/L21) is from 0.65 to 0.9. More preferably, (L12/L11)/(L22/L21) is from 0.75 to 0.85.

Figure 6:
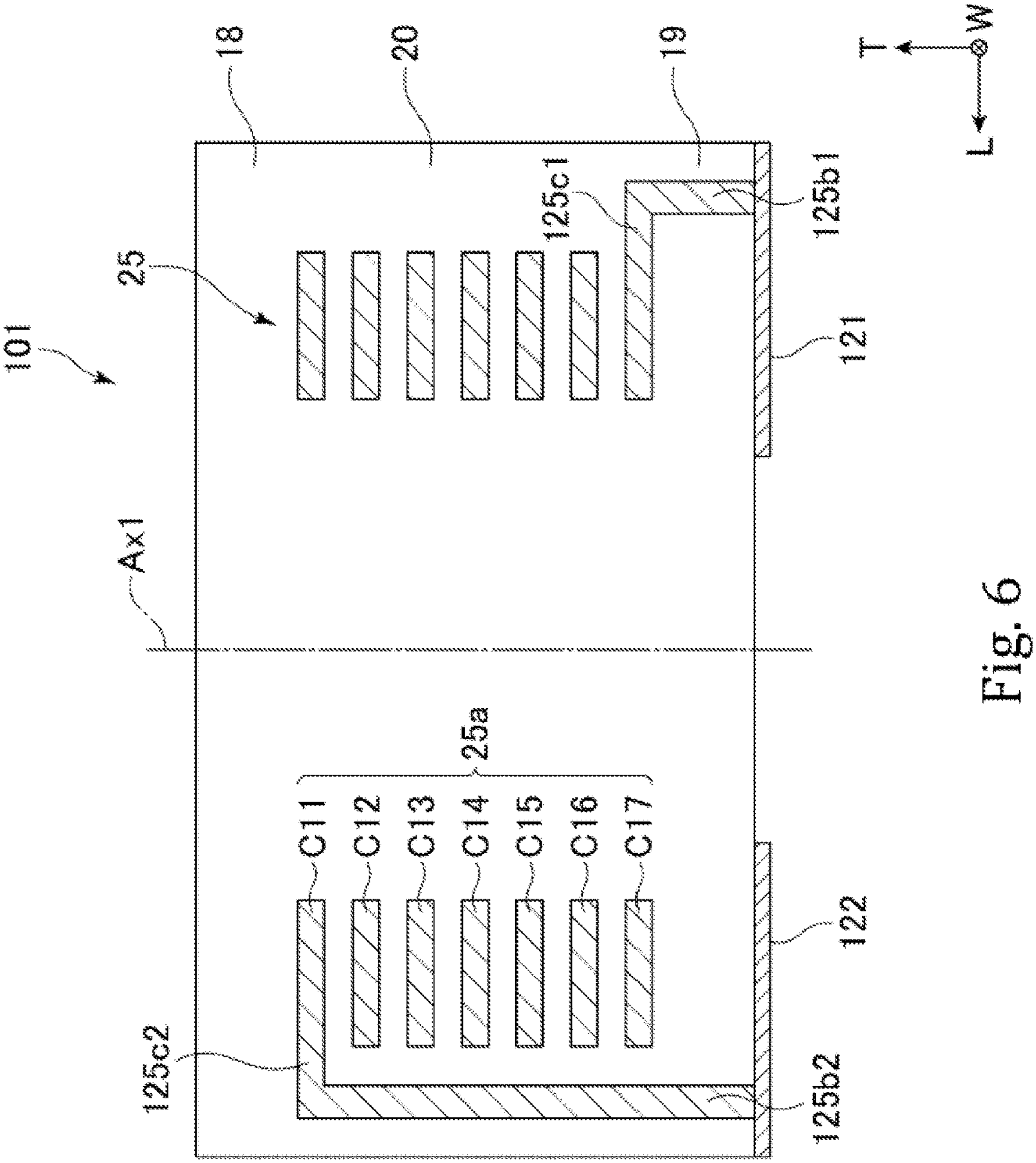
FIG. 6 is a sectional view schematically showing a section of a coil component according to another embodiment.
Figure 7:
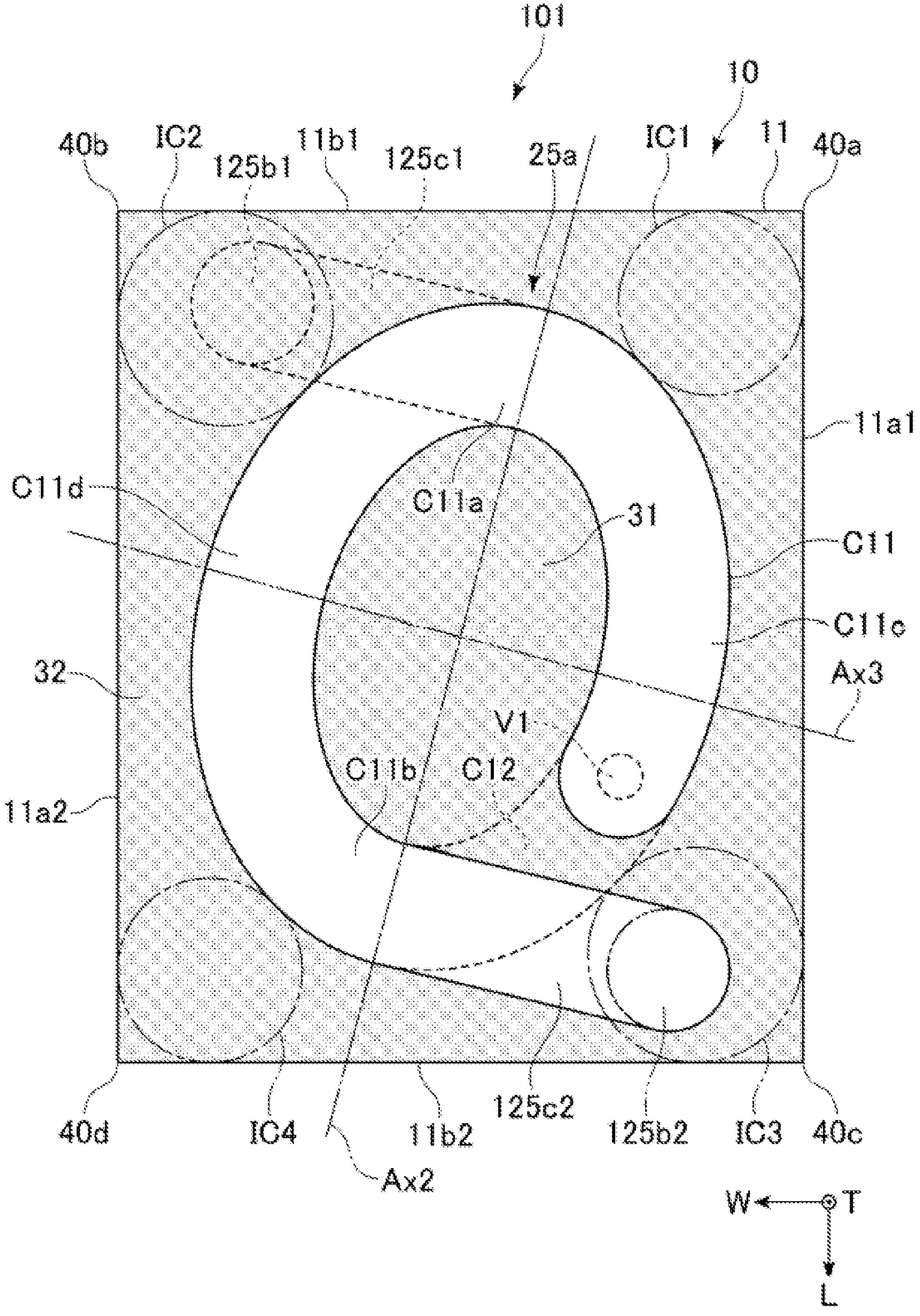
FIG. 7 is a plan view of the coil component of FIG. 6.

Next, a coil component 101 according to another embodiment will be described with reference to FIGS. 6 and 7. FIG. 6 is a sectional view schematically showing a section of the coil component 101 according to the other embodiment, and FIG. 7 is a plan view of the coil component 101. The elements of the coil component 101 that are the same as or similar to those of the coil component 1 will not be described. The coil component 101 includes external electrodes 121, 122, and the winding portion 25*a* is connected to the external electrode 121 via a lead-out portion 125*b*1 and a connecting portion 125*c*1 and also connected to the external electrode 122 via a lead-out portion 125*b*2 and a connecting portion 125*c*2.

The external electrodes 121, 122 are disposed on the bottom surface 10*b* of the base body 10. The lead-out portion 125*b*1 extends along the coil axis Ax1 (i.e., along the T-axis direction) and the lower end thereof is connected to the external electrode 121. Likewise, the lead-out portion 125*b*2 extends along the coil axis Ax1. The lower end of the lead-out portion 125*b*2 is connected to the external electrode 122.

The connecting portion 125*c*1 is disposed on the magnetic film 17. One end of the connecting portion 125*c*1 is connected to one end of the conductor pattern C17 disposed on the magnetic film 17. The other end of the connecting portion 125*c*1 is connected to the upper end of the lead-out portion 125*b*1.

The connecting portion 125*c*2 is disposed on the magnetic film 11. One end of the connecting portion 125*c*2 is connected to one end of the conductor pattern C11 disposed on the magnetic film 11. The other end of the connecting portion 125*c*2 is connected to the upper end of the lead-out portion 125*b*2.

In order to provide the lead-out portion 125*b*1 in the base body 10, the magnetic film 17 and the magnetic films 19*a* to 19*d* have a through hole formed therein to receive the lead-out portion 125*b*1 Also, in order to provide the lead-out portion 125*b*2 in the base body 10, the magnetic films 11 to 17 and the magnetic films 19*a* to 19*d* have a through hole formed therein to receive the lead-out portion 125*b*2.

The shapes of the external electrodes 121, 122 are not limited to those in the example shown. The external electrode 121 may be in contact with at least one of the first end surface 10*c*, the top surface 10*a*, the first side surface 10*e*, and the second side surface 10*f*, in addition to the bottom surface 10*b* of the base body 10. The external electrode 122 may be in contact with at least one of the second end surface 10*d*, the top surface 10*a*, the first side surface 10*e*, and the second side surface 10*f*, in addition to the bottom surface 10*b* of the base body 10. The shapes of the external electrodes 121, 122 may be the same as those of the external electrodes 21, 22.

As shown in FIG. 7, the lead-out portion 125*b*1 is positioned within the second imaginary circle IC2 that contacts with the second long side 11*a*2, the first short side 11*b*1, and the winding portion 25*a* and extends from the external electrode 121 to one end of the connecting portion 125*c*1 along the coil axis Ax1. In plan view, the entirety of the lead-out portion 125*b*1 may be positioned within the second imaginary circle IC2, or only a portion of the lead-out portion 125*b*1 may be positioned within the second imaginary circle IC2. The lead-out portion 125*b*2 is positioned within the third imaginary circle IC3 that contacts with the first long side 11*a*1, the second short side 11*b*2, and the winding portion 25*a* and extends from the external electrode 122 to one end of the connecting portion 125*c*2 along the coil axis Ax1. In plan view, the entirety of the lead-out portion 125*b*2 may be positioned within the third imaginary circle IC3, or only a portion of the lead-out portion 125*b*2 may be positioned within the third imaginary circle IC3.

In coil component 101, the region near the corner 40*b* where the second imaginary circle IC2 is positioned and the region near the corner 40*c* where the third imaginary circle IC3 is positioned are more distant from the winding portion 25*a* than the region near the corner 40*a* and the region near the corner 40*d*, and thus the magnetic flux generated by the change in the current flowing through the winding portion 25*a* is less likely to pass through the regions inside the second imaginary circle IC2 and the third imaginary circle IC3. Since the magnetic flux cannot pass through the lead-out portion 125*b*1 and the lead-out portion 125*b*2, the presence of the lead-out portion 125*b*1 and the lead-out portion 125*b*2 extending in the base body 10 causes degradation of the inductance of the coil component 101. The magnetic flux is less likely to pass through the regions inside the second imaginary circle IC2 and the third imaginary circle IC3 even if the lead-out portion 125*b*1 and the lead-out portion 125*b*2 are not disposed therein, and therefore, the presence of the lead-out portion 125*b*1 and the lead-out portion 125*b*2 inside the second imaginary circle IC2 and the third imaginary circle IC3, respectively, is less apt to degrade the inductance of the coil component 101. In other words, the degradation of the inductance of the coil component 101 can be inhibited by the presence of the lead-out portion 125*b*1 and the lead-out portion 125*b*2 inside the second imaginary circle IC2 and the third imaginary circle IC3, respectively, as compared to the case where the lead-out portion 125*b*1 and the lead-out portion 125*b*2 are disposed in other regions of the base body 10 outside the second imaginary circle IC2 and the third imaginary circle IC3. Thus, in the coil component 101, the major axis Ax2 of the winding portion 25*a* is inclined with respect to the first long side 11*a*1, thereby improving the magnetic flux density in the regions near the first imaginary circle IC1 and the fourth imaginary circle IC4, and at the same time, the lead-out portion 125*b*1 and the lead-out portion 125*b*2 are disposed in the regions inside the second imaginary circle IC2 and the third imaginary circle IC3 that contribute less to the improvement of the inductance, thereby inhibiting the degradation of the inductance caused by the lead-out portions 125*b*1, 125*b*2.

Figure 8:
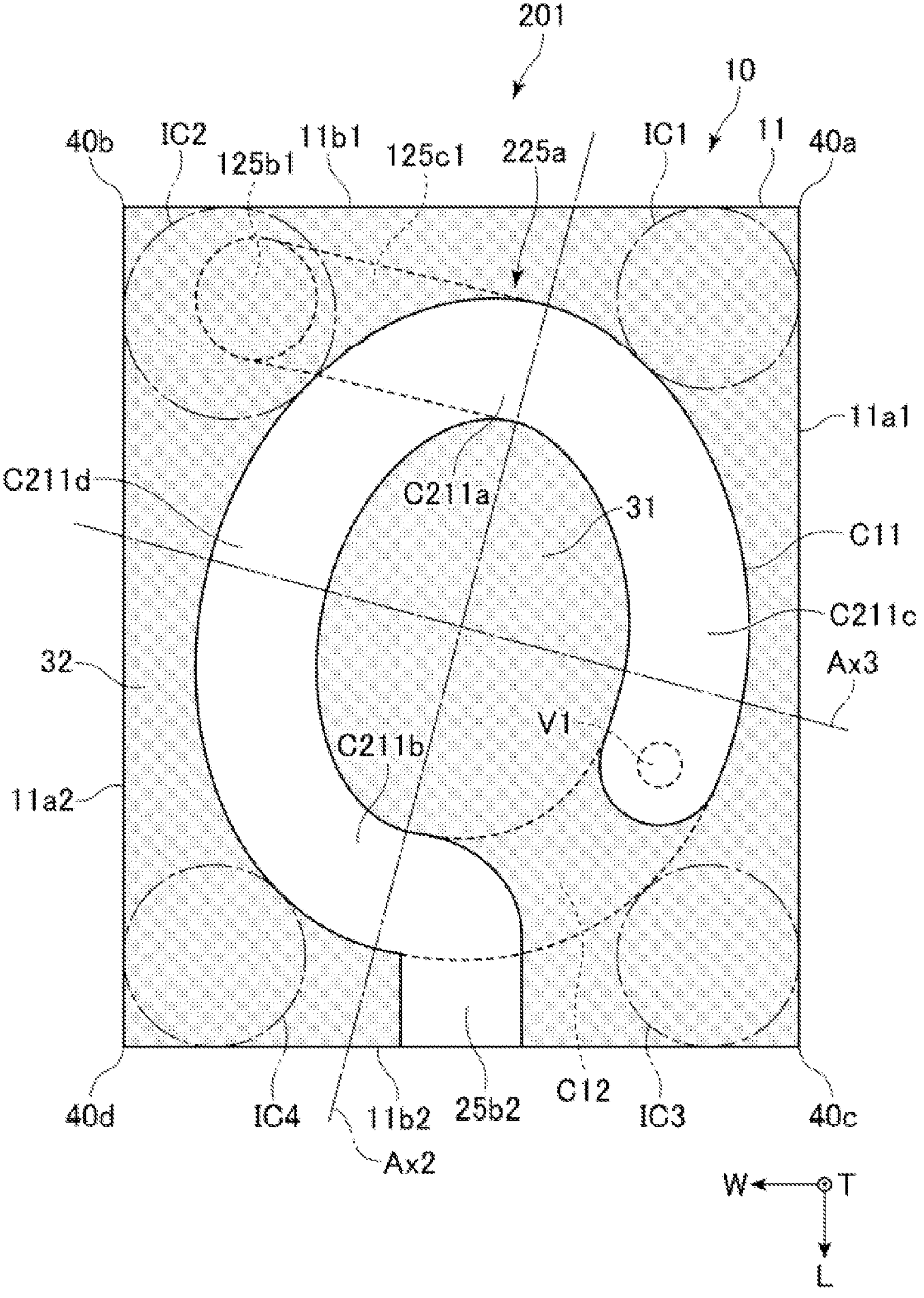
FIG. 8 is a plan view schematically showing a coil component according to another embodiment.

Next, a coil component 201 according to still another embodiment will be described with reference to FIG. 8. FIG. 8 is a plan view showing the coil component 201 relating to the other embodiment. The elements of the coil component 201 that are the same as or similar to those of the coil component 1 will not be described. The coil component 201 includes a winding portion 225*a* having a different shape than the winding portion 25*a*. Specifically, the winding portion 25*a* has a symmetrical shape with respect to the major axis Ax2, whereas the winding portion 225*a* has an asymmetric shape with respect to the major axis Ax2. More specifically, the portion of the winding portion 225*a* closer to the first long side 11*a*1 than the major axis Ax2 has a larger perimeter in the circumferential direction around the coil axis Ax1 than the portion of the winding portion 225*a* closer to the second long side 11*a*2 than the major axis Ax2. In other words, the winding portion 225*a* protrudes toward the third corner 40*c* such that the distance from the third corner 40*c* to the winding portion 225*a* is smaller than the distance from the second corner 40*b* to the winding portion 225*a*. Therefore, in the coil component 201, the third imaginary circle IC3 is smaller than the second imaginary circle IC2.

The winding portion 225*a* has a first portion C211*a* facing the first short side 11*b*1, a second portion C211*b* facing the second short side 11*b*2, a third portion C211*c* facing the first long side 11*a*1, and a fourth portion C211*d* facing the second long side 11*a*2. In one embodiment, the interval between the second portion C211*b* and the second short side 11*b*2 may be smaller than the interval between the first portion C211*a* and the first short side 11*b*1. In one embodiment, the interval between the third portion C211*c* and the first long side 11*a*1 may be smaller than the interval between the fourth portion C211*d* and the second long side 11*a*2.

In the coil component 201, the distance between the winding portion 225*a* and the third corner 40*c* is smaller than the distance between the winding portion 225*a* and the second corner 40*b*, and thus the magnetic flux generated by the change in the current flowing through the coil conductor 25 is more likely to pass through the vicinity of the third corner 40*c* than in the coil component 1. Accordingly, the coil component 201 can have a further improved inductance as compared to the coil component 1.

Although the external electrodes are not shown in FIG. 8, the coil component 201 can include, for example, the external electrodes 21, 22, as with the coil component 1. In the embodiment shown, one end of the winding portion 225*a* of the coil component 201 is connected to the external electrode 21 via the lead-out portion 125*b*1 and the connecting portion 125*c*1, and the other end of the winding portion 225*a* is connected to the external electrode 21 via the lead-out portion 25*b*2. Thus, in the coil component 201, the lead-out portion 125*b*1 extending along the coil axis Ax1 is disposed in the region inside the second imaginary circle IC2 that contributes less to the improvement of the inductance, thereby inhibiting the degradation of the inductance caused by the lead-out portion 125*b*1.

It is also possible that the one end of the winding portion 225*a* is connected to the external electrode 21 via the lead-out portion 25*b*1 provided on the magnetic film 11 instead of the lead-out portion 125*b*1.

Figure 9:
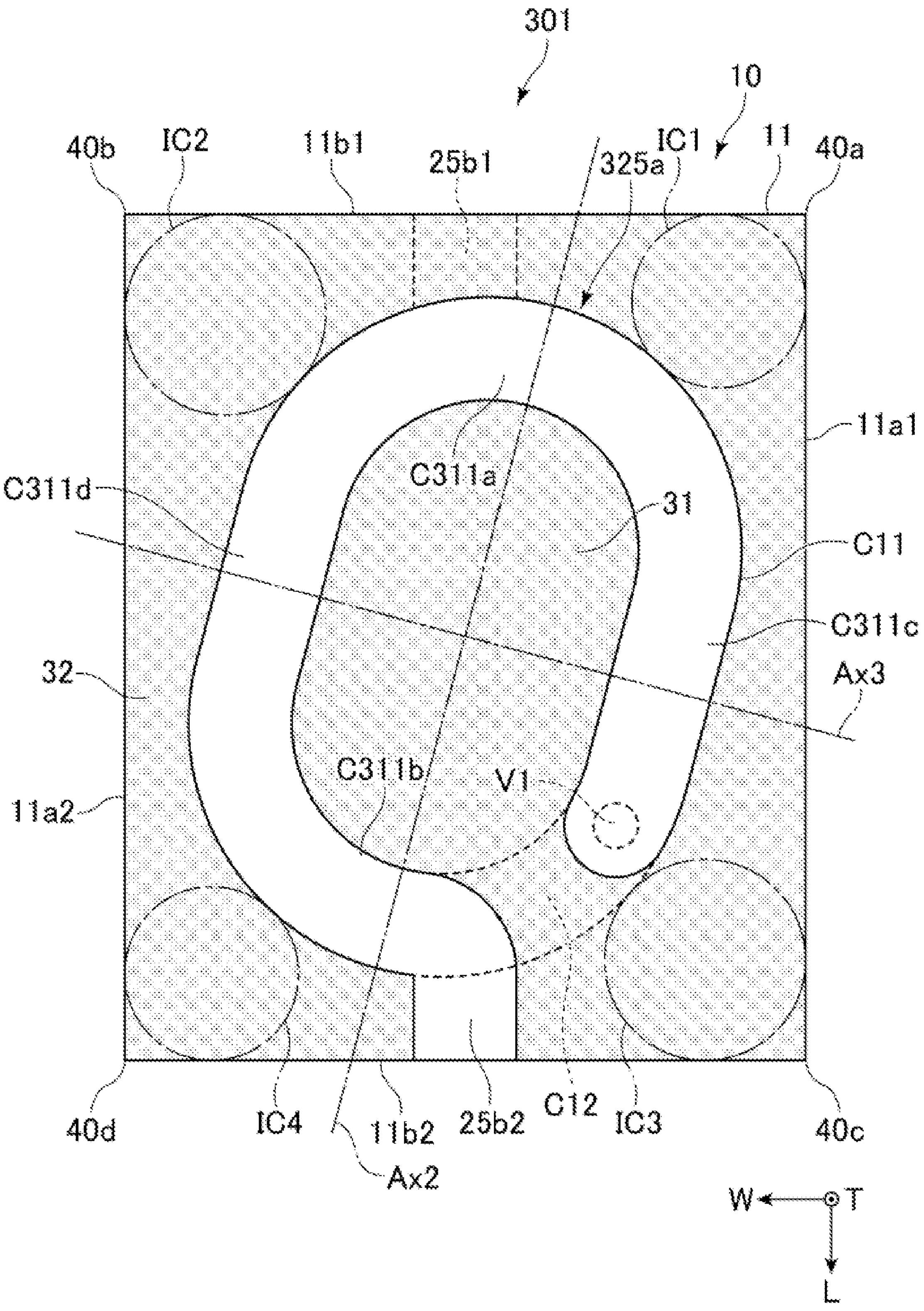
FIG. 9 is a plan view schematically showing a coil component according to another embodiment.

Next, a coil component 301 according to still another embodiment will be described with reference to FIG. 9. FIG. 9 is a plan view showing the coil component 301 relating to the other embodiment. The elements of the coil component 301 that are the same as or similar to those of the coil component 1 will not be described. The coil component 301 includes a winding portion 325*a* having a different shape than the winding portion 25*a*. As shown, the winding portion 325*a* has an oval shape. The major axis Ax2 of the winding portion 325*a* is inclined with respect to the first long side 11*a*1 of the base body 10 by about 20°.

In one embodiment, the winding portion 325*a* has a first portion C311*a* facing the first short side 11*b*1, a second portion C311*b* facing the second short side 11*b*2, a third portion C311*c* facing the first long side 11*a*1, and a fourth portion C311*d* facing the second long side 11*a*2. In the embodiment shown, the first portion C311*a* is convexly curved toward the first short side 11*b*1, and the second portion C311*b* is convexly curved toward the second short side 11*b*2. In addition, the third portion C311*c* and the fourth portion C311*d* extend in a straight line. The third portion C311*c* and the fourth portion C311*d* may extend in parallel to the major axis Ax2. The coil component 301 is also configured such that the radii of the first imaginary circle IC1 and the fourth imaginary circle IC4 are smaller than the radii of the second imaginary circle IC2 and the third imaginary circle IC3. In the embodiment shown, the winding portion 325*a* is connected to the external electrodes 21, 22 via the lead-out portions 25*b*1, 25*b*2, respectively, but it is also possible that the coil component 301 includes the lead-out portions 125*b*1, 125*b*2 instead of the lead-out portions 25*b*1, 25*b*2 and includes the external electrodes 121, 122 instead of the external electrodes 21, 22. In this case, the winding portion 325*a* is connected to the external electrodes 121, 122 via the lead-out portions 125*b*1, 125*b*2.

Figure 10A:
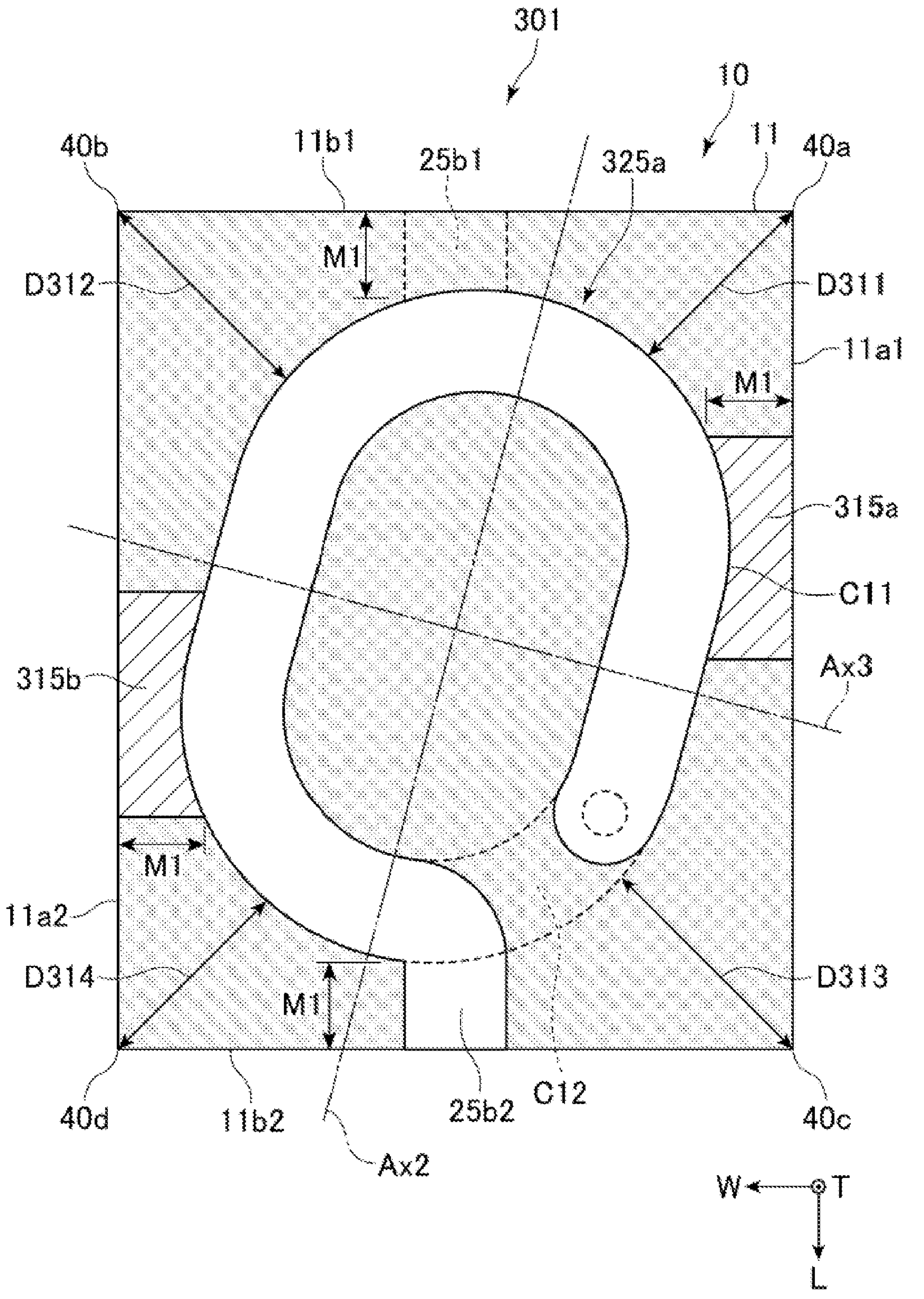
FIG. 10A is a plan view of the coil component of FIG. 9 with dimension lines drawn therein.
Figure 10B:
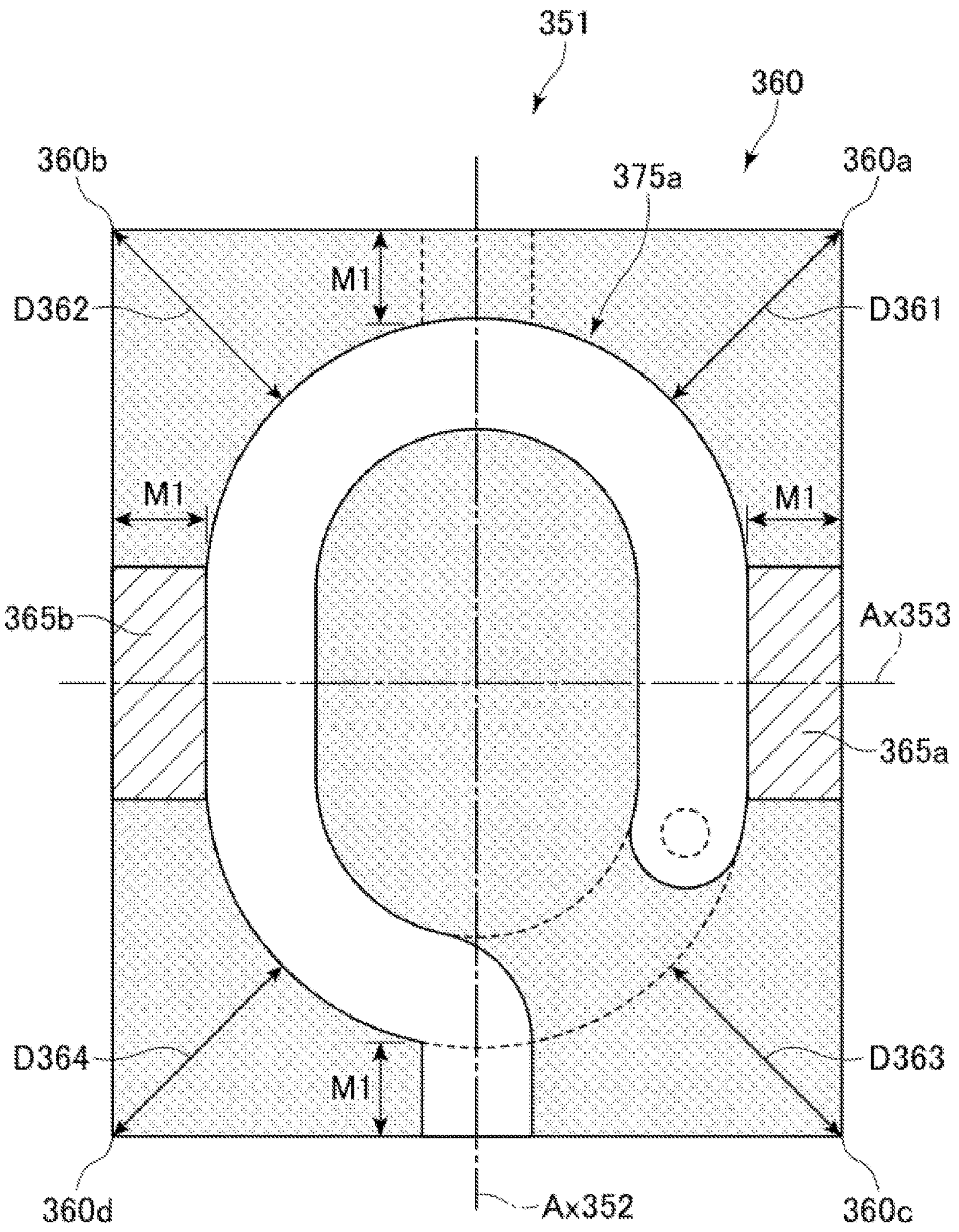
Fig. 10B (Related Art)
FIG. 10B is a schematic plan view of a conventional coil component.

With reference to FIGS. 10A and 10B, the following describes the coil component 301 in comparison with a conventional coil component 351. FIG. 10A is a plan view of the coil component 301 according to one embodiment, and FIG. 10B is a plan view of the conventional coil component 351 having a winding portion 375*a* with an oval shape in plan view. FIG. 10A shows the plan view of FIG. 9 with dimension lines added thereto.

As shown in FIG. 10B, in the conventional coil component 351 shown in plan view, the major axis Ax52 of the winding portion 375*a* of the coil conductor extends in the direction parallel to the long sides of the base body 360 having a rectangular shape, and the minor axis Ax353 extends in the direction parallel to the short sides of the base body 360 having the rectangular shape. In other words, in the conventional coil component 351 shown in plan view, the major axis of the winding portion 375*a* is not inclined with respect to the long sides of the base body 360. Therefore, the distances D361, D362, D363, D364 from the four corners 360*a*, 360*b*, 360*c*, 360*d* of the base body 360 to the winding portion 375*a* (these distances refer to the direct distances; this also applies to the following description) are the same.

On the other hand, as shown in FIG. 10A, in the coil component 301, the major axis Ax2 of the winding portion 325*a* is inclined with respect to the first long side 11*a*1 of the base body 10, and thus the distance D311 from the first corner 40*a* of the base body 10 to the winding portion 325*a* is smaller than the distance D312 from the second corner 40*b* to the winding portion 325*a*. Likewise, the distance D311 is smaller than the distance D313 from the third corner 40*c* to the winding portion 325*a*. The distance D311 may be the same as the distance D314 from the fourth corner 40*d* to the winding portion 325*a*. The distance D314 is smaller than both the distance D312 and the distance D313.

In the conventional coil component 351, the magnetic flux generated by the change in the current flowing through the winding portion 375*a* is less likely to pass through the regions near the four corners 360*a* to 360*d* that are at a large distance from the winding portion 375*a*. Therefore, the regions near the four corners 360*a* to 360*d* of the base body 360 contribute less to improvement of the characteristics of the coil component 351. On the other hand, in the coil component 301 according to one embodiment, the major axis Ax2 of the winding portion 325*a* is inclined with respect to the first long side 11*a*1 of the base body 10, and thus the distance D311 from the top right corner 40*a* of the base body 10 to the winding portion 325*a* is smaller than the distance D361 from the top right corner 360*a* of the base body 360 to the winding portion 375*a* in the conventional coil component 351. Likewise, the distance D314 from the bottom left corner 40*d* of the base body 10 to the winding portion 325*a* is smaller than the distance D364 from the bottom left corner 360*d* of the base body 360 to the winding portion 375*a* in the conventional coil component 351. Therefore, in the coil component 301, the magnetic flux generated when the current flowing through the coil conductor 25 changes is more likely to pass through the regions near the first corner 40*a* and the fourth corner 40*d* among the four corners 40*a* to 40*d* of the base body 10, as compared to the conventional coil component 351. Therefore, even if the winding portion 375*a* and the winding portion 325*a* have the same shape, the inductance of the coil component 301 can be higher than the inductance of the conventional coil component 351. Thus, in the coil component 301, the winding portion 325*a* is disposed such that the major axis Ax2 is inclined with respect to the first long side 11*a*1 of the base body 10, and thus the regions near the corners of the base body 10 can be utilized to improve the inductance.

In coil components, magnetic saturation tends to occur in regions where the distance (margin) between the outer circumferential edge of the coil conductor and the surface of the base body is small. In the conventional coil component 351 shown in FIG. 10B, all of the distances from the winding portion 375*a* to the long sides and the short sides of the base body 360 are M1. In this case, magnetic saturation is likely to occur in a first region 365*a* and a second region 365*b* of the margin region located between the straight portions of the winding portion 375*a* and the surfaces of the base body 360.

In contrast, in the coil component 301 according to one embodiment, the major axis Ax2 of the winding portion 325*a* having an oval shape is inclined with respect to the first long side 11*a*1, and therefore, as shown in FIG. 10A, a first region 315*a* and a second region 315*b* where the distance between the winding portion 325*a* and the surface of the base body 10 is M1 or less have a smaller area than the first region 365*a* and the second region 365*b* in the conventional coil component 351, respectively. Therefore, in the coil component 301, magnetic saturation is less likely to occur than in the conventional coil component 351, in which the winding portion has the same shape as in the coil component 301 and the major axis Ax352 is not inclined with respect to the long sides of the base body 360. Thus, since the major axis Ax2 of the winding portion 325*a* having straight portions (the third portion C311*c* and the fourth portion C311*d*) is inclined with respect to the first long side 11*a*1 of the base body 10, the direct-current (DC) superposition characteristics of the coil component 301 can be improved.

Figure 11:
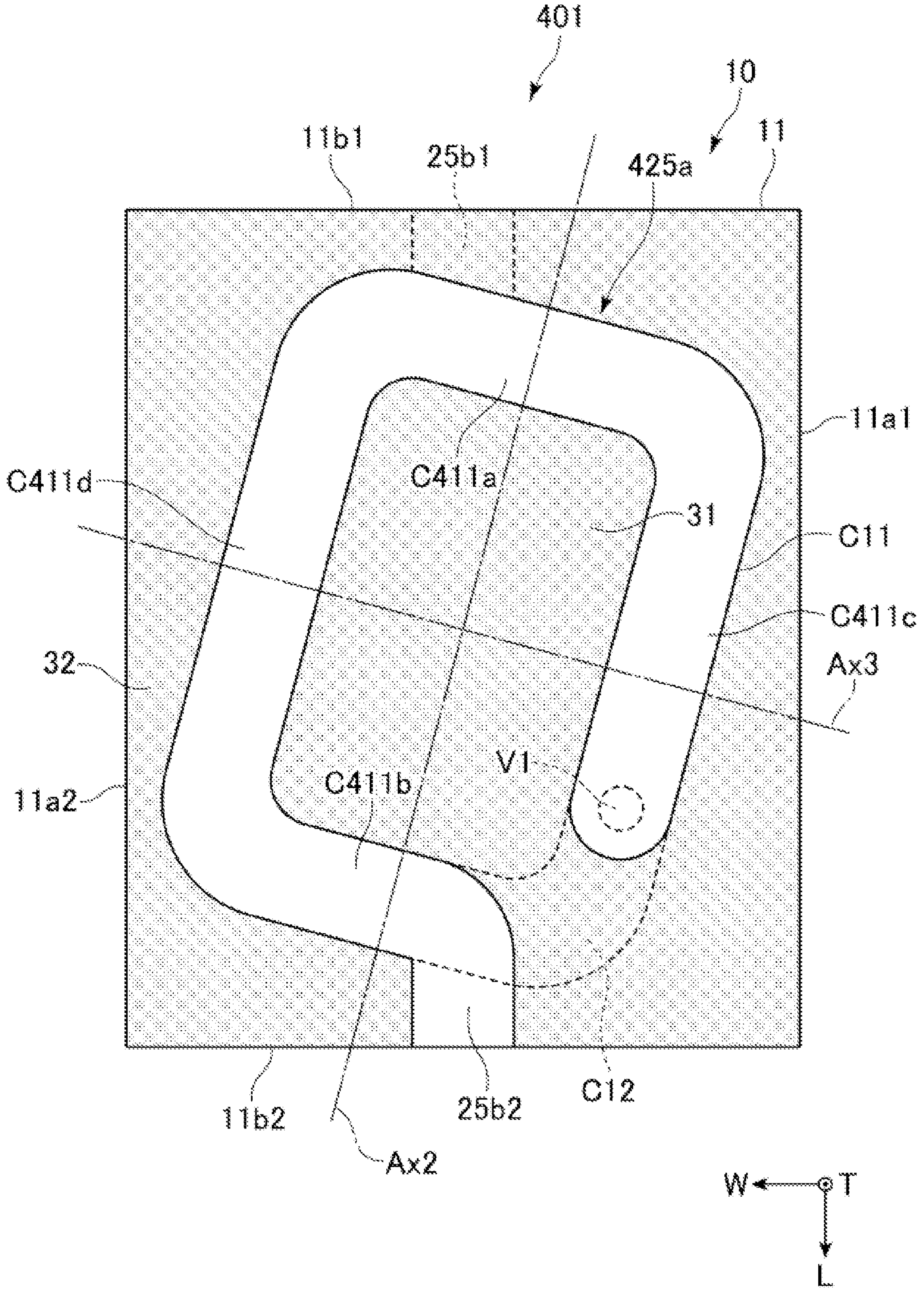
FIG. 11 is a plan view schematically showing a coil component according to another embodiment.

Next, a coil component 401 according to still another embodiment will be described with reference to FIG. 11. FIG. 11 is a plan view showing the coil component 401 relating to the still other embodiment. The elements of the coil component 401 that are the same as or similar to those of the coil component 1 will not be described. The coil component 401 includes a winding portion 425*a* having a different shape than the winding portion 25*a*. As shown, the winding portion 425*a* has a rounded rectangular shape. The major axis Ax2 of the winding portion 425*a* is inclined with respect to the first long side 11*a*1 of the base body 10 by about 20°.

In one embodiment, the winding portion 425*a* has a first portion C411*a* facing the first short side 11*b*1, a second portion C411*b* facing the second short side 11*b*2, a third portion C411*c* facing the first long side 11*a*1, and a fourth portion C411*d* facing the second long side 11*a*2. All of the first portion C411*a*, the second portion C411*b*, the third portion C411*c*, and the fourth portion C411*d* extend in a straight line. Thus, the winding portion 425*a* has a rectangular shape. The four corners of the winding portion 425*a* are rounded. Since the four corners of the winding portion 425*a* are rounded, it is possible to inhibit concentration of the magnetic flux in the regions near the winding portion 425*a*.

Figure 12A:
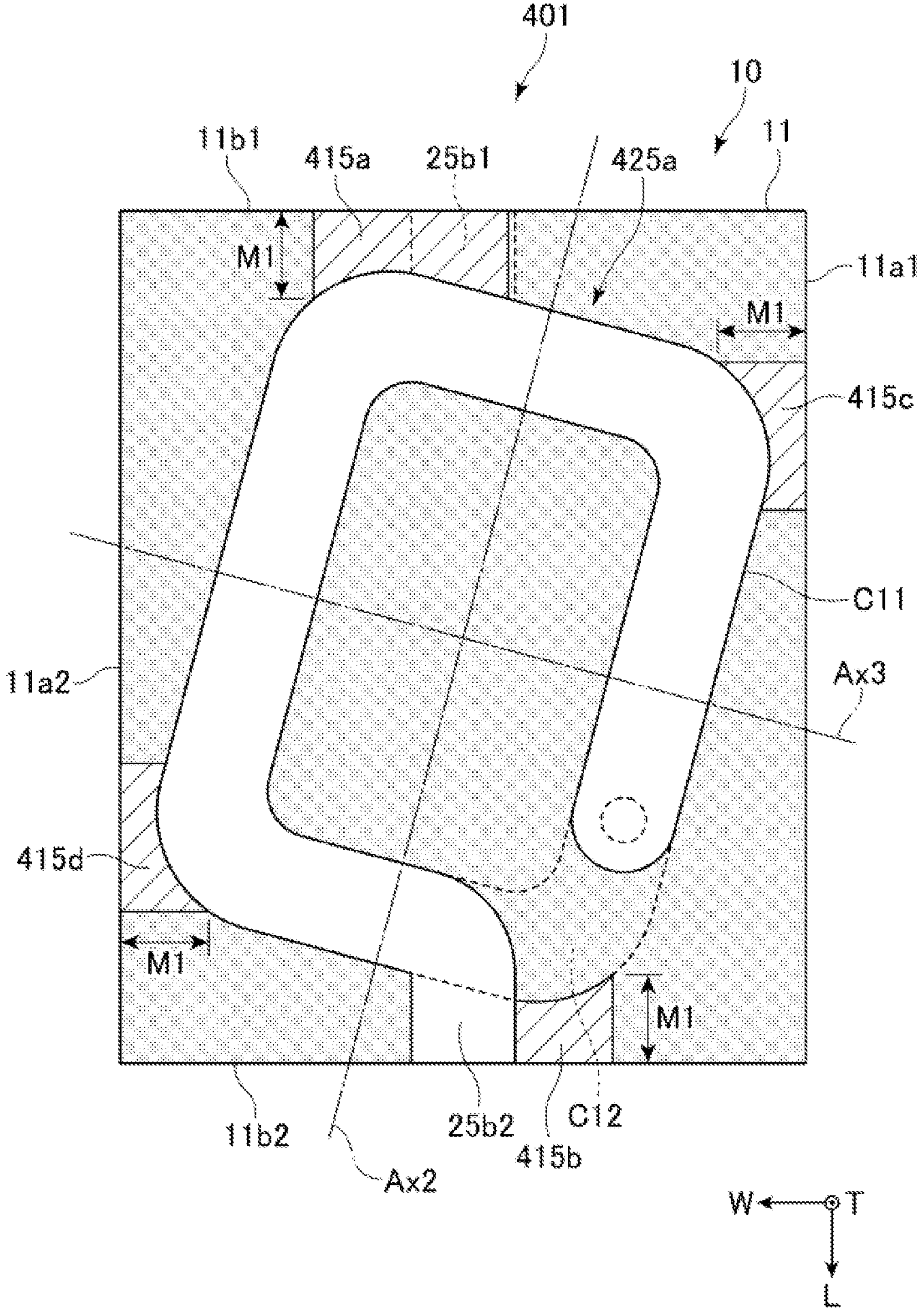
FIG. 12A is a plan view of the coil component of FIG. 11 with dimension lines drawn therein.
Figure 12B:
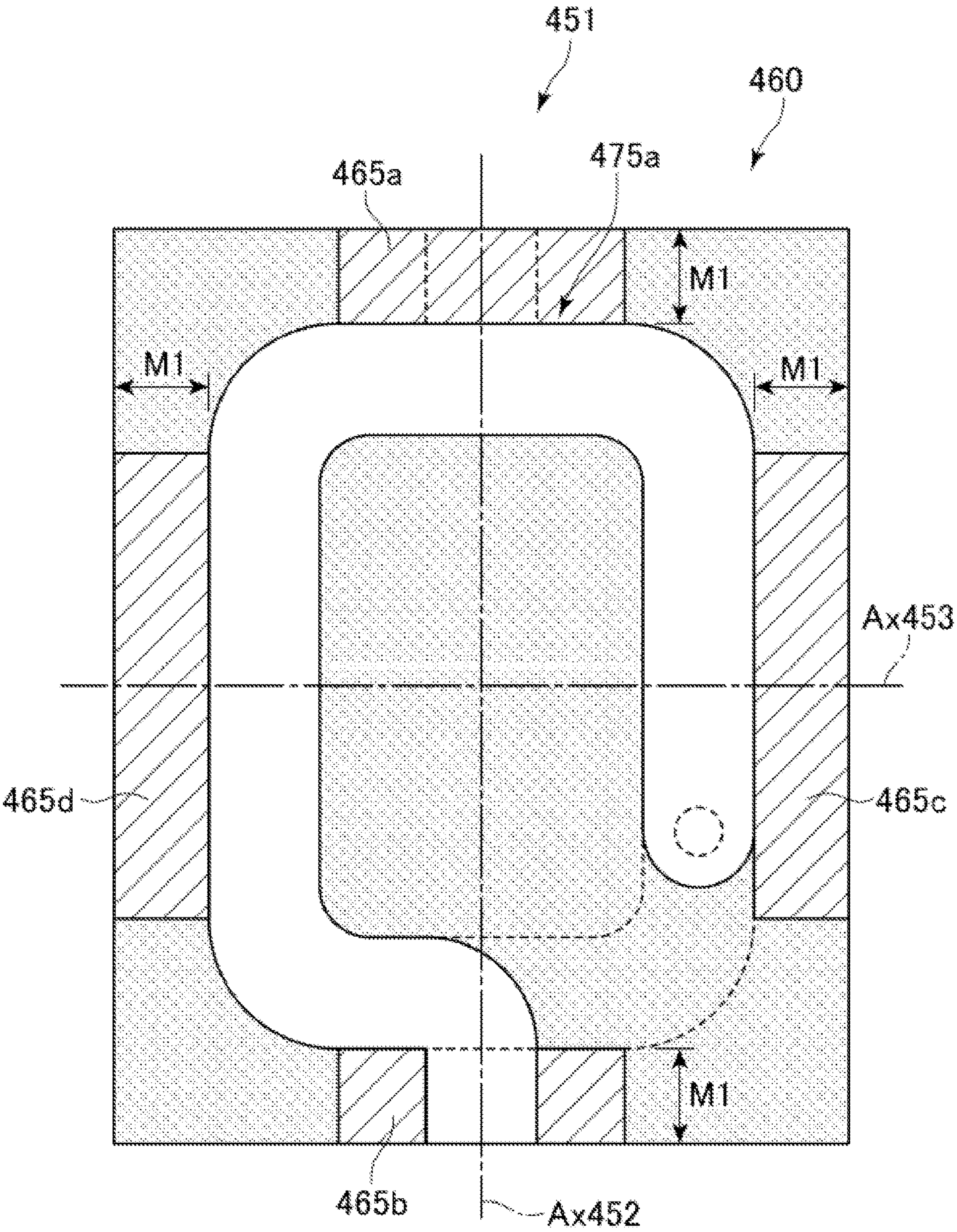
Fig. 12B (Related Art)
FIG. 12B is a schematic plan view of a conventional coil component.

With reference to FIGS. 12A and 12B, the following describes the coil component 401 in comparison with a conventional coil component 451. FIG. 12A is a plan view of the coil component 401 according to one embodiment, and FIG. 12B is a plan view of a conventional coil component 450 having a winding portion 475*a* with a rectangular shape in plan view. FIG. 12A shows the plan view of FIG. 11 with dimension lines added thereto.

As shown in FIG. 12B, in the conventional coil component 451, the major axis Ax452 of the winding portion 475*a* of the coil conductor extends in the direction parallel to the long sides of the base body 460 having a rectangular shape, and the minor axis Ax453 extends in the direction parallel to the short sides of the base body 460 having the rectangular shape. In other words, in the conventional coil component 451 shown in plan view, the major axis of the winding portion 475*a* is not inclined with respect to the long sides of the base body 460. In the conventional coil component 451 shown in FIG. 12B, all of the distances from the winding portion 475*a* to the long sides and the short sides of the base body 460 are M1. In this case, magnetic saturation is likely to occur in a first region 465*a*, a second region 465*b*, a third region 465*c*, and a fourth region 465*d* located between the straight portions of the winding portion 475*a* and the surfaces of the base body 460.

In contrast, in the coil component 401 according to one embodiment, the major axis Ax2 of the winding portion 425*a* having a rectangular shape is inclined with respect to the first long side 11*a*1, and therefore, as shown in FIG. 12A, a first region 415*a*, a second region 415*b*, a third region 415*c*, and a fourth region 415*d* where the distance between the winding portion 425*a* and the surface of the base body 10 is M1 or less have a smaller area than the first region 465*a*, the second region 465*b*, the third region 465*c*, and the fourth region 465*d* in the conventional coil component 451, respectively. Therefore, in the coil component 401 according to one embodiment, magnetic saturation is less likely to occur than in the conventional coil component 451, in which the winding portion has the same shape as in the coil component 401 and the major axis Ax452 is not inclined with respect to the long sides of the base body 460. Thus, since the major axis Ax2 of the winding portion 425*a* having straight portions is inclined with respect to the first long side 11*a*1 of the base body 10, the direct-current (DC) superposition characteristics of the coil component 401 can be improved.

The present invention may encompass aspects realized by combining the above embodiments, unless they create a contradiction. For example, the winding portion 25*a* having an elliptic shape shown in FIG. 7 may be replaced with the winding portion 325*a* having an oval shape or the winding portion 425*a* having a rectangular shape. In other words, one of the aspects of the invention disclosed herein can be realized by configuring the embodiment shown in FIG. 7 such that the winding portion 25*a* is replaced with the winding portion 325*a* having an oval shape or the winding portion 425*a* having a rectangular shape.

As described above, the invention disclosed herein is also applicable to various coil components other than laminated inductors. For example, the invention may be applied to wire-wound coil components having a core and a lead wire wound thereon.

Next, a description is given of an example of a method of manufacturing the coil component 1. The coil component 1 can be manufactured by, for example, a lamination process. An example is hereinafter described of the manufacturing method of the coil component 1 by the sheet lamination.

To begin with, magnetic sheets are fabricated as precursors of the magnetic films constituting the magnetic base body 10 (the magnetic films 18*a* to 18*d* making up the top cover layer 18, the magnetic films 11 to 17 making up the magnetic layer 20, and the magnetic films 19*a* to 19*d* making up the bottom cover layer 19). The magnetic sheets are fabricated as follows. For example, metal magnetic particles are mixed and kneaded with a resin to prepare a slurry. The slurry is then applied to a surface of a plastic base film using the doctor blade technique or any other common methods and dried, and the dried slurry is cut to a predetermined size.

Next, a through hole is formed in each of the magnetic sheets as the precursors of the magnetic films 11 to 16 at a predetermined position so as to extend through the magnetic sheets in the T-axis direction. Following this, a conductive paste is printed by screen printing on the top surface of each of the magnetic sheets to be the magnetic films 11 to 17, so that a conductor pattern is formed on each of the magnetic sheets. The through holes formed in the magnetic sheets are filled with the conductive paste. In the above manner, the conductor patterns formed on the magnetic sheets as the precursors of the magnetic films 11 to 17 form the conductor patterns C11 to C17 after heating, and the metal filling the through holes forms the vias V1 to V6 after heating. The conductor patterns can also be formed by any various known methods other than the screen printing.

Next, the magnetic sheets as the precursors of the magnetic films 11 to 17 are stacked to obtain a coil laminate. The magnetic sheets as the precursors of the magnetic films 11 to 17 are stacked such that the conductor patterns C11 to C17 formed on the corresponding magnetic sheets are each electrically connected to the adjacent conductor patterns through the vias V1 to V6.

Following this, a plurality of magnetic sheets are stacked to form a top laminate, which is to be used as the top cover layer 18. Similarly, a plurality of magnetic sheets are stacked to form a bottom laminate, which is to be used as the bottom cover layer 19.

Next, the bottom laminate, the coil laminate, and the top laminate are stacked in the stated order in the direction of the Taxis from the negative side to the positive side, and these stacked laminates are bonded together by thermal compression using a pressing machine to make a main laminate. Instead of forming the bottom laminate, the coil laminate, and the top laminate, the main laminate may be made by sequentially stacking all of the magnetic sheets prepared in advance and bonding the stacked magnetic sheets collectively by thermal compression. Then, the main laminate is diced to a desired size by using a cutter such as a dicing machine or a laser processing machine to make a chip laminate. Polishing treatment such as barrel polishing may be performed on the end portions of the chip laminate, if necessary.

Next, the chip laminate is degreased and then subjected to thermal treatment, so that the base body 10 is obtained. The thermal treatment forms an oxide phase 40 on the surface of the metal magnetic particles, so that the adjacent metal magnetic particles 30 are bonded to each other via the oxide phase 40 sandwiched therebetween. During the thermal treatment, an oxide film is formed on the surface of the base body 10. The heating is performed on the chip laminate at a temperature of 600° C. to 900° C. for a duration of 20 to 120 minutes, for example.

Next, a conductive paste is applied to both end portions of the chip laminate to form the external electrodes 21 and 22. At least one of a solder barrier layer or a solder wetting layer may be formed on the external electrode 21 and the external electrode 22 as necessary. The coil component 1 is obtained, as described above.

It is also possible to manufacture the coil component 1 by the compression molding, the lamination process, the slurry build method or any other known methods.

A part of the steps included in the above manufacturing method may be skipped as necessary. In the manufacturing method of the coil component 1, steps not described explicitly in this specification may be performed as necessary. A part of the steps included in the manufacturing method of the coil component 1 may be performed in different order within the purport of the present invention. A part of the steps included in the production method of the coil component 1 may be performed at the same time or in parallel, if possible.

The dimensions, materials, and arrangements of the constituent elements described for the above various embodiments are not limited to those explicitly described for the embodiments, and these constituent elements can be modified to have any dimensions, materials, and arrangements within the scope of the present invention.

Constituent elements not explicitly described herein can also be added to the above-described embodiments, and it is also possible to omit some of the constituent elements described for the embodiments.

The words "first," "second," and "third" used herein are added to distinguish constituent elements but do not necessarily limit the numbers, orders, or contents of the constituent elements. The numbers added to distinguish the constituent elements should be construed in each context. The same numbers do not necessarily denote the same constituent elements among the contexts. The use of numbers to identify constituent elements does not prevent the constituent elements from performing the functions of the constituent elements identified by other numbers.

What is claimed is:

1. A coil component comprising:

a base body having a rectangular shape, the base body having a first long side and a first short side shorter than the first long side, as viewed from one axial direction;

a coil conductor provided in the base body, the coil conductor including a winding portion, the winding portion having a shape of a convex set and including a first curved portion convexly curved toward the first short side, the winding portion having a major axis and a minor axis orthogonal to the major axis, the major axis of the winding portion being inclined with respect to the first long side, as viewed from the one axial direction; and an external electrode electrically connected to the coil conductor.

2. The coil component of claim 1, wherein, as viewed from the one axial direction, the major axis of the winding portion intersects with the first short side, and a geometric center of the base body coincides with a geometric center of the winding portion.

3. The coil component of claim 1, wherein a ratio of a dimension of the winding portion in a direction of the minor axis orthogonal to a direction of the major axis to a dimension of the winding portion in the direction of the major axis is smaller than a ratio of a length of the first short side to a length of the first long side.

4. The coil component of claim 1, wherein, as viewed from the one axial direction, the base body includes a core region located inside the winding portion and a margin region located outside the winding portion, and wherein a difference between an area of the margin region and an area of the core region is 10% or less of the area of the core region.

5. The coil component of claim 1, wherein, as viewed from the one axial direction, the base body has a second long side opposed to the first long side and a second short side opposed to the first short side, and wherein, as viewed from the one axial direction, the winding portion includes a second curved portion convexly curved toward the second short side.

6. The coil component of claim 5, wherein, as viewed from the one axial direction, a radius of a first imaginary circle in contact with the first short side, the first long side, and the winding portion is smaller than a radius of a second imaginary circle in contact with the first short side, the second long side, and the winding portion.

7. The coil component of claim 6, wherein the coil conductor includes a lead-out portion extending in the one axial direction within the second imaginary circle, and wherein the external electrode is connected to one end of the lead-out portion.

8. The coil component of claim 7, wherein, as viewed from the one axial direction, a radius of a third imaginary circle in contact with the first long side, the second short side, and the winding portion is smaller than the radius of the second imaginary circle.

9. The coil component of claim 1, wherein, as viewed from the one axial direction, the winding portion includes a third curved portion convexly curved toward the first long side.

10. The coil component of claim 1, wherein, as viewed from the one axial direction, the coil conductor includes a first straight portion facing the first long side of the base body and extending in a straight line.

11. A coil component comprising:

a base body having a rectangular shape, the base body having a first long side and a first short side shorter than the first long side, as viewed from one axial direction;

a coil conductor provided in the base body, the coil conductor including a winding portion, the winding portion having a shape of a convex set and including a first straight portion facing the first long side and extending in a straight line, the winding portion having a major axis and a minor axis orthogonal to the major axis, the major axis of the winding portion being inclined with respect to the first long side, as viewed from the one axial direction; and an external electrode electrically connected to the coil conductor.

12. A coil component comprising:

a base body having a rectangular shape, the base body having a first long side, a first short side shorter than the first long side, a second long side opposed to the first long side, and a second short side opposed to the first short side, as viewed from one axial direction;

an external electrode provided on the base body; and a coil conductor provided in the base body, the coil conductor including a winding portion and a lead-out portion, the base body being configured such that a radius of a first imaginary circle in contact with the first short side, the first long side, and the winding portion of the coil conductor is smaller than a radius of a second imaginary circle in contact with the first short side, the second long side, and the winding portion, the winding portion having a shape of a convex set and having a major axis and a minor axis orthogonal to the major axis, the lead-out portion extending in the one axial direction within the second imaginary circle and connected to the external electrode, the major axis being inclined with respect to the first long side, as viewed from the one axial direction.

* * * * *